US006401122B1

(12) United States Patent
Matsui et al.

(10) Patent No.: US 6,401,122 B1
(45) Date of Patent: *Jun. 4, 2002

(54) COMMUNICATION MANAGEMENT APPARATUS

(75) Inventors: Kazuki Matsui; Takashi Ohno; Akinori Iwakawa; Naohisa Kawaguchi, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/761,363

(22) Filed: Dec. 9, 1996

(30) Foreign Application Priority Data

Jul. 19, 1996 (JP) ............................. 8-191084

(51) Int. Cl.[7] .............................. G06F 15/16
(52) U.S. Cl. ...................... 709/227; 709/203; 709/204; 709/205; 709/206; 709/207; 709/223; 709/224; 345/751; 345/753; 345/755; 345/758; 345/759; 345/764; 345/765; 345/741
(58) Field of Search ............................. 380/25; 369/58; 364/748.02; 370/260, 412, 429, 266, 267, 270; 345/330, 331, 349, 332, 751, 755, 753, 758, 467, 760, 752, 754, 762, 741, 329; 709/203, 204, 205, 227, 228, 229, 208, 223, 224; 710/52, 53; 576/692; 395/200.34, 200.35, 200.57, 200.58, 200.59

(56) References Cited

U.S. PATENT DOCUMENTS

| | | | | |
|---|---|---|---|---|
| 4,274,155 A | * | 6/1981 | Funderburk et al. | 370/267 |
| 5,008,853 A | * | 4/1991 | Bly et al. | 345/341 |
| 5,067,154 A | * | 11/1991 | Hosobuchi et al. | 380/25 |
| 5,237,553 A | * | 8/1993 | Fukushima et al. | 369/58 |
| 5,280,583 A | * | 1/1994 | Nakayama et al. | 709/205 |
| 5,319,758 A | * | 6/1994 | Arai et al. | 711/209 |
| 5,343,403 A | * | 8/1994 | Beidle et al. | 364/748.02 |
| 5,392,400 A | * | 2/1995 | Berkowitz et al. | 709/203 |
| 5,452,299 A | * | 9/1995 | Thessin et al. | 370/62 |
| 5,659,691 A | * | 8/1997 | Durward et al. | 395/329 |
| 5,689,641 A | * | 11/1997 | Ludwig et al. | 709/241 |
| 5,719,928 A | * | 2/1998 | Pinnell et al. | 379/202 |

(List continued on next page.)

OTHER PUBLICATIONS

J. Oikarinen, D. Reed, May 1993.*
J. Oikarinen et al., Internet Relay Chat Protocol, Network Working Group, RFC. 1459, May 1993.*
Oikarinen et al., Network Working Group, RFC 1459, Internet Relay Chat Protocol, May 1993.*
Oikarinen et al., Networking Working Group, Internet Relay Chat, May 1993.*

Primary Examiner—Mark H. Rinehart
Assistant Examiner—William C. Vaughn, Jr.
(74) Attorney, Agent, or Firm—Staas & Halsey LLP

(57) ABSTRACT

There is provided a communication management apparatus for managing a joining of symbols in a virtual world in a message communication system in which a plurality of user terminals are interconnected, the plurality of user terminals sharing the virtual world comprising a plurality of virtual spaces, and the symbols each defined for the associated one of the user terminals which will join the virtual world, and messages are exchanged among a plurality of user terminals corresponding to a plurality of symbols which have entered the same virtual space. In accordance with the communication management apparatus, the upper limit of number of symbols (users) capable of joining in the communication area is defined for each communication area. According to the communication management apparatus, it is possible to provide a user management system abounding in flexibility.

5 Claims, 19 Drawing Sheets

U.S. PATENT DOCUMENTS

| | | | | |
|---|---|---|---|---|
| 5,729,687 A | * | 3/1998 | Rothrock et al. | 709/204 |
| 5,736,982 A | * | 4/1998 | Suzuki et al. | 345/330 |
| 5,757,669 A | * | 5/1998 | Christie et al. | 709/205 |
| 5,761,692 A | * | 6/1998 | Ozden et al. | 711/4 |
| 5,802,296 A | * | 9/1998 | Morse et al. | 709/208 |
| 5,805,846 A | * | 9/1998 | Nakajima et al. | 345/330 |
| 5,812,652 A | * | 9/1998 | Jodoin et al. | 379/205 |
| 5,812,653 A | * | 9/1998 | Jodoin et al. | 379/205 |
| 5,828,843 A | * | 10/1998 | Grimm et al. | 709/228 |
| 5,880,731 A | * | 3/1999 | Liles et al. | 345/349 |
| 5,886,734 A | * | 3/1999 | Ozone et al. | 348/15 |
| 5,907,324 A | * | 5/1999 | Larson et al. | 345/330 |
| 5,923,330 A | * | 7/1999 | Tarlton et al. | 345/419 |
| 5,974,409 A | * | 10/1999 | Sanu et al. | 707/3 |
| 5,978,463 A | * | 11/1999 | Jurkevics et al. | 379/202 |
| 6,163,799 A | * | 12/2000 | Kambayashi et al. | 709/204 |

* cited by examiner

COMMUNICATION MANAGEMENT APPARATUS

BACKGROUND OF THE INVENTION

1. Field of the Invention

The present invention relates to a communication management apparatus for managing a joining of symbols in a virtual world in a message communication system in which a plurality of user terminals are interconnected, the plurality of user terminals sharing the virtual world comprising a plurality of virtual spaces, and the symbols each defined for the associated one of the user terminals which will join the virtual world, and messages are exchanged among a plurality of user terminals corresponding to a plurality of symbols which have entered the same virtual space.

2. Description of the Related Art

Recently, there has been developed a message communication system referred to as a so-called chat system in which messages are exchanged between user terminals through a so-called personal computer communication and the like.

FIG. 14 is a conceptual diagram of a message communication system comprising so-called servers and clients.

A plurality of user terminals, or a plurality of client computers $100\_1, 100\_2, \ldots, 100\_n$ are connected through a communication network 200 to a host computer 300 which serves as a server, so as to exchange messages among the client computers $100\_1, 100\_2, \ldots, 100\_n$ via the host computer 300.

In such a message communication system, there is known a system comprising a common virtual world when the system is viewed as a whole, and the client computers $100\_1, 100\_2, \ldots, 100\_n$ having their own symbols referred to as so-called avatars, in which the client computer, who intends to have a message exchange or communication, displays on its display screen the virtual world and avatars or symbols of the clients entered the virtual world just as if a plurality of clients, who are of interest in communication, enter the virtual world and have conversations.

FIG. 15 is a conceptual diagram of a message communication system in which avatars or symbols enter the virtual world and have conversations.

Communication areas 1, 2 and 3 illustrated in FIG. 15 represent virtual spaces capable of observing mutual figures or avatars in the virtual world defined in the system, or capable of interacting with one another. Each of the communication areas corresponds to, for example, a room or the like in the real world. According to FIG. 15, in communication area 1, there exist an avatar (hereinafter, it happens that the avatar is referred to as user A simply, and this is the similar as to the matter of other users) of user A who operates the user terminal of "client A", and user B who operates the user terminal of "client B"; in communication area 2, users C and D; and in communication area 3, user E. For example, in client A (a user terminal of user A), it is possible to display on a display screen of client A looks of the inside of communication area 1 and the figure of user B in communication area 1, just as if observing looks the inside of communication area 1 through eyes of user A in communication area 1 (for example, a room). In a similar fashion to that of client A, in client B (a user terminal of user B), it is possible to display on a display screen of client B looks of the inside of communication area 1 and the figure of user A in communication area 1, just as if observing looks the inside of communication area 1 through eyes of user B in communication area 1.

In this manner, messages are exchanged between client A and client B, while giving to user A operating client A and user B operating client B the impression just as if user A and user B enter the virtual space referred to as communication area 1 and have a conversation with one another. Each user operating the associated client (user terminal) can vary a position coordinate of his own avatar in the virtual world which his own avatar enters, by means of operating the associated client. Operation for varying the position coordinate causes his own avatar to move in the virtual world.

With respect to utilization of the communication areas, it is not restricted to a way for simply having a conversation or exchanging messages. There is considered, for example, a way of utilization of the communication areas such that a certain store is provided in the virtual world as communication area 1, in which user A is a salesclerk, user B is a customer, and user B as the customer does his shopping in the virtual store while having a conversation.

As one of aspects for joining in the communication areas, there is considered not only an aspect in which users join in the communication areas in the form of avatars and have conversations as mentioned above, but also an aspect in which a screen of the communication area is displayed and users join in as so-called ghosts who are capable of simply listening a conversation between avatars appeared on the scene.

For the message communication system having the defined virtual world as mentioned above, it is necessary to limit the number of users or avatars who enter the communication area in order to have a smooth conversation (message exchange). The reasons why this is so done are that making entrance of a lot of users into a single communication area causes a display screen of the communication area to be confused, and a load of computation for performing treatments of movement and conversation of such a lot of users in the communication area is increased.

FIG. 16 is a typical illustration of a user management unit for performing a management of users, which is provided in a host computer.

The host computer has a request processing unit for a communication with a client computer, and a user management unit for managing a joining state of the user on each communication area.

The user management unit is provided with an avatar management table which is capable of managing 6 avatars in the maximum on each communication area. That is, the number of avatars, who are permitted to simultaneously enter the communication area, is determined as 6 on each communication area.

The user management unit is also provided with a user information list which is also provided on each communication area. In the user information list, there are managed users who join in the communication areas as so-called ghosts, the ghost being permitted to joining in simply regarding listening a conversation (receiving messages) but not permitted to talk (transmitting messages) himself. The number of joining members as the ghosts is not restricted.

FIG. 17 is a flowchart useful for understanding a flow of a processing for joining in communication areas in a message communication system provided with the host computer having the user management unit of the constitution shown in FIG. 16.

First, in step $17\_1$, a client designates a specified communication area to the host computer to request the joining in the communication area.

In step $17\_2$, upon receipt of the client's request, the host computer refers to an avatar management table of the communication area in which the client wishes to join, and investigates whether the number of the avatars joining in the communication area reaches a predetermined number (here 6 members). If the number does not reach the predetermined number, the process goes to step 17_3 in which information (user information) concerning the user of the client, who desires a joining, is added to the avatar management table, and in step 17_4, it is informed all the clients, who join as avatars or ghosts in the communication area in which the user newly joined, that the user joined as the avatar in the communication area of interest.

Upon receipt of such a notification, each of the clients updates images in the associated communication area so that the avatar of the user newly joined is included in the communication area.

The client, who newly joined in step 17_4, may receives information involved in all avatars joining in the communication area and graphic data of the communication area as well. In this respect, hereinafter, it will happen that the description is omitted.

In step 17_2, when it is determined that the number of the avatars joining in the communication area has reached a predetermined number (6 members), the process goes to 17_5 in which user information of the user is added to the user information list. In other words, this means that the user joins as the ghost in the communication area.

In step 17_6, it is informed the client, who desired a joining, that the user joins in the form of ghost. Incidentally, such a notification includes information involved in all avatars joining in the communication area and graphic data of the communication area as well. Also in this respect, hereinafter, it will happen that the similar description is omitted.

In case of the joining processing shown here, when a user desires a joining, first, it is tried that the user is joined as an avatar, and when the number of the avatars joined has reached a predetermined number, the user is admitted to join in the form of ghost.

FIG. 18 is a flowchart useful for understanding a processing for joining in as a ghost in a case where a user, who joins in as an avatar, declares that the user wishes to change to a ghost, in a message communication system provided with a host computer having the user management unit of the constitution shown in FIG. 16.

First, in step 18_1, a user joining in as an avatar operates the associated client computer to request to a host computer that the user wishes to change to a ghost. Upon receipt of such a request, the host computer removes user information of the client from the avatar management table and adds the same to the user information list (step 18_2). Thus, the user changes from the avatar to the ghost. In step 18_3, it is informed all of the clients of avatars and ghosts joining in the same communication area that the user has become the ghost. A client, who received such information, deletes the avatar of the user changed to the ghost from the screen of the communication area. Thereafter, there is kept the situation such that the number of avatars joining in the communication area dropped below the fixed number, until a user, who requests newly a joining as an avatar, appears.

FIG. 19 is a flowchart useful for understanding a processing for joining in as an avatar in a case where a user, who joins in as a ghost, makes a request for joining in as an avatar, in a message communication system provided with a host computer having the user management unit of the constitution shown in FIG. 16.

First, in step 19_1, a client transmits to the host computer a request for joining in as an avatar. Upon receipt of the client's request, the host computer locates vacancy of the avatar management table (step 19_2). In step 19_3, it is determined as to whether the number of the avatars joining in the communication area is less than a predetermined number (here 6 members) or reaches the predetermined number. If the number of the avatars is less than the predetermined number (6 members), the process goes to step 19_4 in which user information of the user requested for a joining in as an avatar is removed from the user information list and is set up to vacancy of the avatar management table. In step 19_5, it is informed all clients joining in the communication area as the avatars or the ghosts that the user becomes an avatar.

On the other hand, in step 19_3, when it is determined that the number of avatars has reached the predetermined number (6 members), the process goes to step 19_6 in which it is informed the client, who requested a joining in as an avatar, that the processing for joining in as an avatar ended in failure and the client is obliged to continuously join in as the ghost.

According to the conventional message communication system, a joining in communication areas as avatars or ghosts is managed in accordance with, for example, the above-mentioned processing. Such a processing, however, has been associated with the following drawbacks.

(1) Even limit in the number of avatars is allocated for each communication area. Thus, it is impossible to increase the number of participants even if there is set up a large communication area such as a hall, for example.

(2) There is no limit in the number of ghosts. Thus, it is impossible to prevent the nonspecific majority of users from listening to speeches in a certain communication area.

(3) When a user makes a request to a host computer for a joining, or when a user, who has joined in as a ghost, makes a request for a joining in as an avatar, the users can join in as an avatar if there exists a vacancy on the avatar management table. However, unfortunately, when the users cannot join in as an avatar, there is a need for the users to repeatedly make a request for a joining in as an avatar, until the users can join in as an avatar.

SUMMARY OF THE INVENTION

In view of the foregoing, it is therefore an object of the present invention to provide a communication management apparatus having a novel user management system.

To attain the above-mentioned object, according to the present invention, there is provided a first communication management apparatus for managing a joining of symbols (so-called avatars) in a virtual world in a message communication system in which a plurality of user terminals are interconnected, the plurality of user terminals sharing the virtual world comprising a plurality of virtual spaces (a plurality of communication areas), and the symbols each defined for the associated one of the user terminals which will join the virtual world, and messages are exchanged among a plurality of user terminals corresponding to a plurality of symbols which have entered the same virtual space, said communication management apparatus comprising: a virtual space area management unit for holding pieces of area-inherent-information to control entrance of the symbols into the virtual spaces, each corresponding to an associated one of said plurality of virtual spaces; and a user management unit for managing entrance of the symbols for each virtual space in accordance with the area-inherent-information.

In the first communication management apparatus as mentioned above, it is preferable that said message communication system permits presence of receiving only user terminals for performing receiving only of messages to be exchanged between the user terminals joined in exchange of messages, in addition to the user terminals joining in exchange of messages corresponding to the symbols entered the virtual space; said virtual space area management unit includes in form of the area-inherent-information pieces of information to control the receiving only user terminals joining in the virtual spaces, each of the pieces of information corresponding to the associated one of said plurality of virtual spaces; and said user management unit manages a joining of the receiving only user terminals, in addition to entrance of said symbols, for each virtual space in accordance with the area-inherent-information.

According to the first communication management apparatus, there is provided for each virtual spaces (communication areas) the area-inherent-information, for example, upper limits of number of persons permitted to join in as avatars, the maximum time permitted to stay as avatars in the virtual space, and upper limits of number of persons permitted to join in as ghosts. Thus, it is possible to determine a predetermined number of avatars for each virtual spaces (communication areas) in such a manner that for example, in case of a large hole, a predetermined number of avatars is increased. Therefore, it is possible to adapt the number of avatars to the respective virtual spaces (communication areas), and also to the ability of the host computers (communication management apparatus of the present invention).

To attain the above-mentioned object, according to the present invention, there is provided a second communication management apparatus for managing a joining of symbols (avatars) in a virtual world in a message communication system in which a plurality of user terminals are interconnected, the plurality of user terminals sharing the virtual world comprising a plurality of virtual spaces (a plurality of communication areas), and the symbols each defined for the associated one of the user terminals which will join the virtual world, and messages are exchanged among a plurality of user terminals corresponding to a plurality of symbols which have entered the same virtual space, wherein said message communication system is a system in which a number of symbols, who are permitted in their simultaneous entrance in each of said plurality of virtual spaces, is set up in upper limit, and wherein said communication management apparatus comprises: queue generating means for arranging, in a case where the upper limit of number of symbols have entered any of said plurality of virtual spaces, symbol ID information specifying a symbol requesting entrance in a queue corresponding to the virtual space of interest, when a further request for entrance into the virtual space of interest occurs; and entrance management means for providing such a control that when any of the upper limit of number of symbols entered any of said plurality of virtual spaces is removed from the virtual space and when pieces of symbol ID information are set on the queue corresponding to the virtual space of interest, a symbol specified by symbol ID information set on the top of the queue is entered in the virtual space of interest, and the symbol ID information set on the top of the queue is deleted from the queue.

In case of the second communication management apparatus, it is acceptable that the number of persons admitted to simultaneously enter each of a plurality of virtual spaces is the same as one another on the respective virtual spaces.

According to the second communication management apparatus, when the capacity is over although a user requests to join in as an avatar, a queue is generated. And when an avatar is removed from the communication area of interest, a user set on the top of the queue is admitted to join in as an avatar. Consequently, there is no need to repeatedly make a request over and over until the user is admitted to join in as an avatar. Thus, it is possible to omit the useless communication.

In the second communication management apparatus as mentioned above, it is preferable that said message communication system permits presence of receiving only user terminals for performing receiving only of messages to be exchanged between the user terminals joined in exchange of messages, in addition to the user terminals joining in exchange of messages corresponding to the symbols entered the virtual space; and wherein said communication management apparatus further comprises a receiving only user terminal management unit for causing the user terminals specified by the pieces of symbol ID information set on the queue to join in the virtual space associated with the queue in form of the receiving only user terminals.

In this case, the user set on the queue is admitted to join as ghosts in the communication area of interest similar to the users registered on the conventional user information list (cf. FIG. 16).

A third communication management apparatus of the present invention substantially corresponds one having the features of the above-mentioned first communication management apparatus and the features of the above-mentioned second communication management apparatus. That is, to attain the above-mentioned object, according to the present invention, there is provided the third communication management apparatus for managing a joining of symbols in a virtual world in a message communication system in which a plurality of user terminals are interconnected, the plurality of user terminals sharing the virtual world comprising a plurality of virtual spaces, and the symbols each defined for the associated one of the user terminals which will join the virtual world, and messages are exchanged among a plurality of user terminals corresponding to a plurality of symbols which have entered the same virtual space, said communication management apparatus comprising: a virtual space area management unit for holding pieces of area-inherent-information each to control an upper limit of number of simultaneous entrance of the symbols into the virtual space, each corresponding to an associated one of said plurality of virtual spaces; and a user management unit for managing entrance of the symbols for each virtual space in accordance with the area-inherent-information, wherein said user management unit comprises: queue generating means for arranging, in a case where the upper limit of number of symbols have entered any of said plurality of virtual spaces, symbol ID information specifying a symbol requesting entrance in a queue corresponding to the virtual space of interest, when a further request for entrance into the virtual space of interest occurs; and entrance management means for providing such a control that when any of the upper limit of number of symbols entered any of said plurality of virtual spaces is removed from the virtual space and when pieces of symbol ID information are set on the queue corresponding to the virtual space of interest, a symbol specified by symbol ID information set on the top of the queue is entered in the virtual space of interest, and the symbol ID information set on the top of the queue is deleted from the queue.

According to the third communication management apparatus as mentioned above, it is possible to determine suitably the number of avatars admitted to join in the respective communication area for each communication area, and in addition, it is possible to reduce the load for a user, who wishes to join in as an avatar, to make a request for joining over and over.

In the third communication management apparatus as mentioned above, it is preferable that said message communication system permits presence of receiving only user terminals for performing receiving only of messages to be exchanged between the user terminals joined in exchange of messages, in addition to the user terminals joining in exchange of messages corresponding to the symbols entered the virtual space; and that said user management unit comprises comprises a receiving only user terminal management unit for casing the user terminals specified by the pieces of symbol ID information set on the queue to join in the virtual space associated with the queue in form of the receiving only user terminals.

In this case, the users set on the queue are allowed to join in the communication area in the form of ghosts.

DESCRIPTION OF THE PREFERRED EMBODIMENTS

Hereinafter, there will be described embodiments of the present invention.

Figure 1:
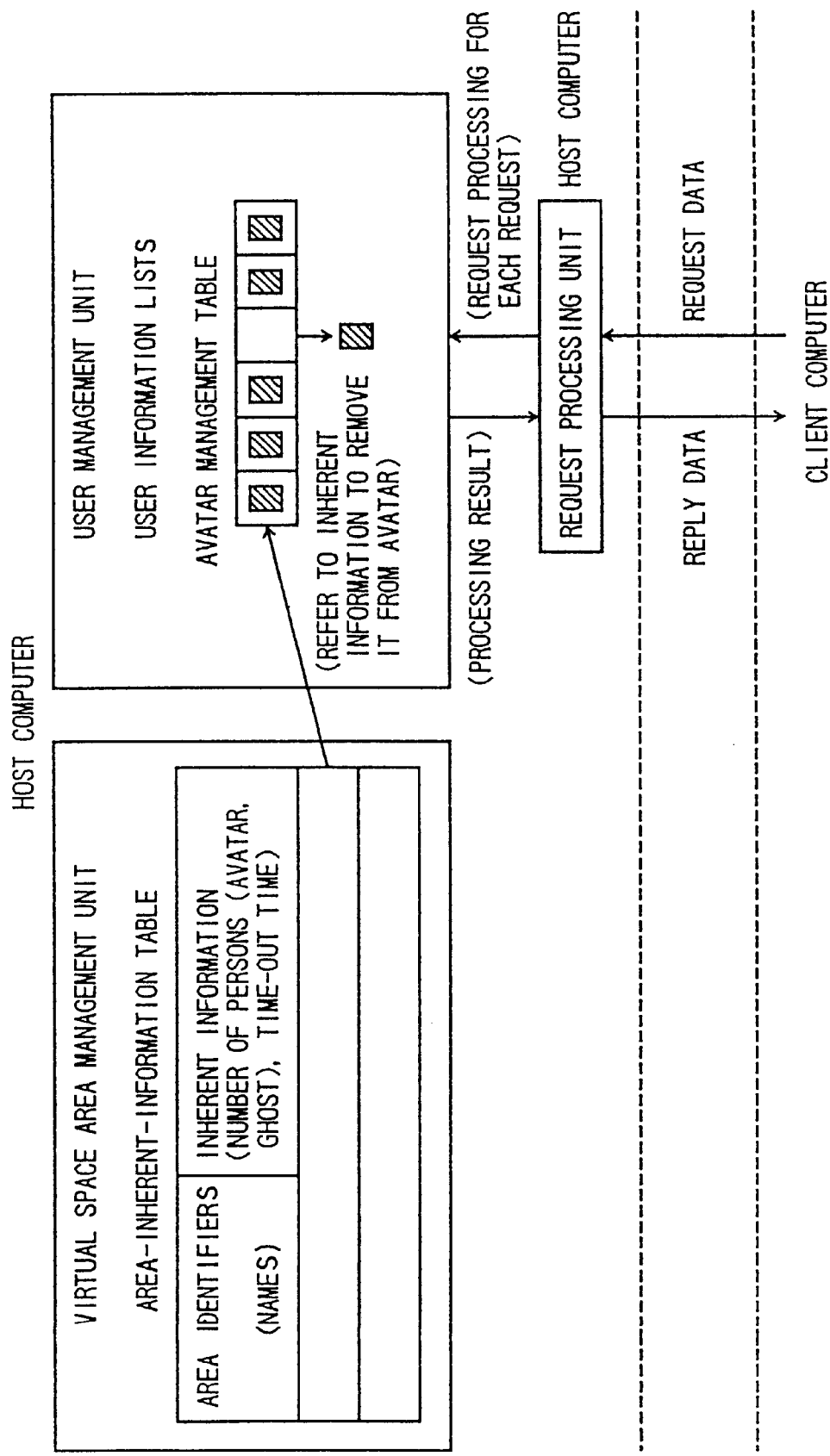
FIG. 1 is a typical construction view of a user management system incorporated into a host computer as one embodiment of the first communication management apparatus according to the present invention.

FIG. 1 is a typical construction view of a user management system incorporated into a host computer as one embodiment of the first communication management apparatus according to the present invention.

The user management system comprises a user management unit and a virtual space area management unit for managing a virtual space. The virtual space area management unit stores therein an area-inherent-information table in which there are recorded area identifiers (names) each for mutually discriminating a plurality of communication areas, the area identifiers being inherent for each communication area, and inherent information as to the communication areas associated with the area identifiers, that is, the limit in the number of persons allowed to join in the communication area as avatars, the limit in the number of persons allowed to join in the communication area as ghosts, and time-out time indicative of the maximum time during a period of which persons are allowed to join in the communication area as avatars.

When a communication area involved in the system is incorporated, a column associated with the communication area is added to the area-inherent-information table and inherent information of the communication area is written into the column. This is rewritable.

Figure 16:
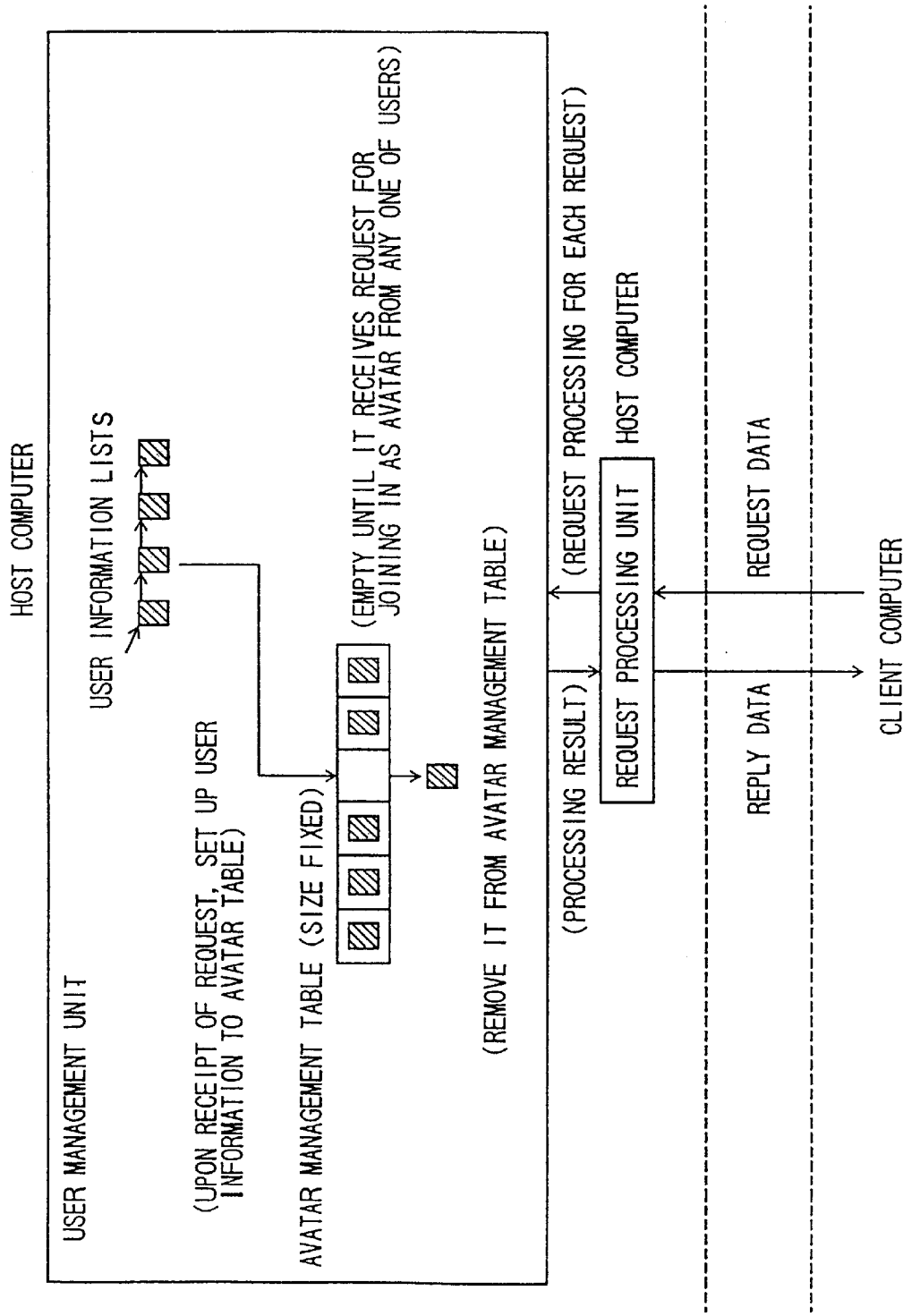
FIG. 16 is a typical illustration of a user management unit for performing a management of users, which is provided in a host computer.

The user management unit has, in a similar fashion to that of FIG. 16, user information lists for managing ghosts, each corresponding to the associated communication area, and avatar management tables for managing avatars, each corresponding to the associated communication area. The number of ghosts recorded on the user information list is restricted by the number of ghosts recorded on the inherent information on the communication area. Regarding the avatar management tables, according to the prior art scheme (refer to FIG. 16), the number of avatars is fixed to even number (6 members in case of the prior art) on each communication area. On the other hand, according to the scheme of the present embodiment, the number of persons allowed to join as avatars in the communication area is determined independently for each communication area in accordance with the associated area-inherent-information table.

Figure 2:
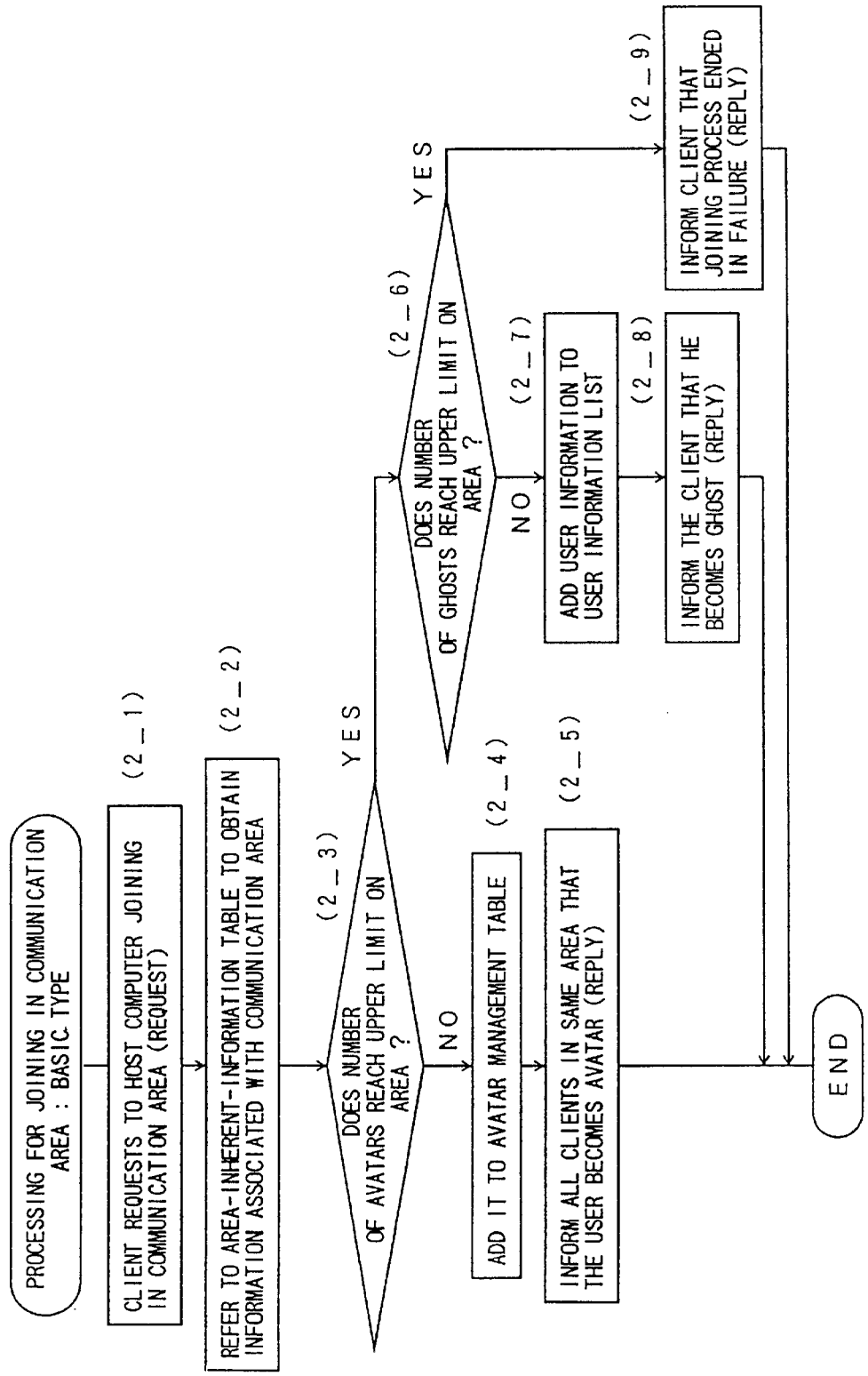
FIG. 2 is a flowchart useful for understanding a processing for joining in a communication area in a message communication system having the host computer of the constitution shown in FIG. 1.

FIG. 2 is a flowchart useful for understanding a processing for joining in a communication area in a message communication system having the host computer of the constitution shown in FIG. 1.

In step 2_1, a client requests to a host computer a joining in a specified communication area through designation of the communication area.

In step 2_2, upon receipt of the request, the host computer refers to the area-inherent-information table to obtain the inherent information on the communication area in which the client wishes to join. In step 2_3, it is determined whether the number of avatars reaches the upper limit on the communication area. When the number of avatars does not reach the upper limit, the process goes to step 2_4 in which user information of the user requesting a joining is added to the avatar management table associated with the communication area, and then goes to step 2_5 in which it is informed all clients joining in the same area as avatars or ghosts that the user requesting a joining in the communication area joins as an avatar.

On the other hand, in step 2_3, when it is determined that the number of avatars on the communication area reaches the upper limit which is set up independently on the communication area, the process goes to step 2_6 in which it is determined whether the number of ghosts on the communication area reaches the upper limit which is set up independently on the communication area. When it is determined that the number of ghosts does not reach the upper limit, the process goes to step 2_7 in which user information of the user requesting a joining is added to the user information list, and then goes to step 2_8 in which it is informed the client requesting a joining that the user joins as a ghost.

Further, in step 2_6, when it is determined that not only the number of avatars but also the number of ghosts on the communication area reaches the upper limit, the process goes to step 2_9 in which it is informed the client requesting a joining that the joining process ended in failure.

Figure 3:
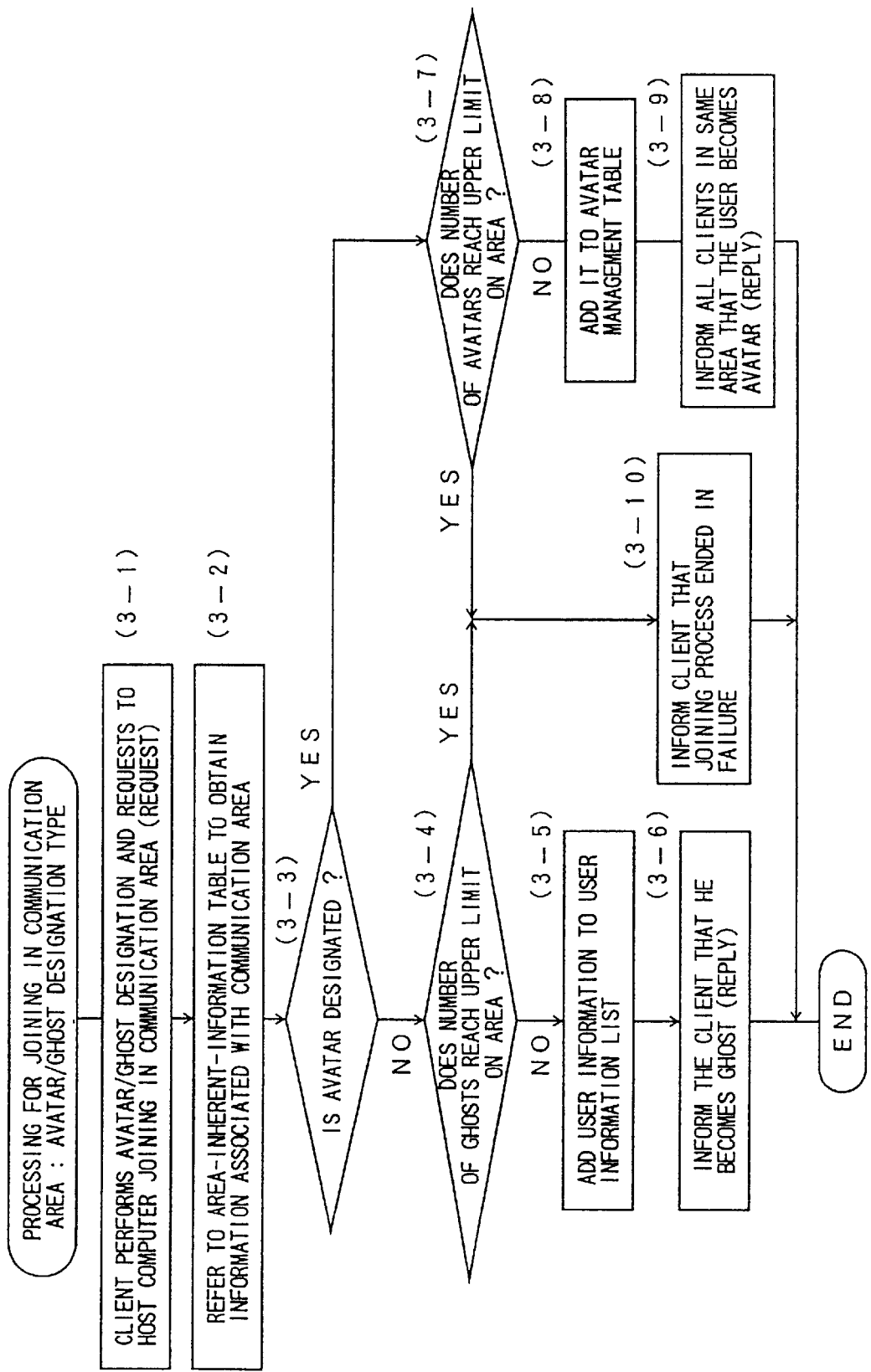
FIG. 3 is a flowchart useful for understanding another processing for joining in a communication area in a message communication system having the host computer of the constitution shown in FIG. 1.

FIG. 3 is a flowchart useful for understanding another processing for joining in a communication area in a message communication system having the host computer of the constitution shown in FIG. 1. In case of the joining process, a client makes a joining request declaring that the client wishes to join in as an avatar or as a ghost, and forwards the host computer the joining request.

In step 3_1, a client requests to a host computer a joining through designation of a desired communication area, and further designation as to whether the client wishes to join in the communication area as an avatar or as a ghost.

In step 3_2, upon receipt of the client's request, the host computer refers to the area-inherent-information table to obtain the inherent information on the communication area in which the client wishes to join. In step 3_3, it is determined whether the client wishes to join as an avatar or as a ghost. When the client wishes to join as a ghost, the process goes to step 3_4 in which a user information list associated with the communication area is referred to so as to investigate the number of persons joining in the communication area as a ghost, and it is determined whether the number of persons reaches the upper limit shown in the obtained inherent-information.

When the number of ghosts on the communication area does not reach the upper limit, the process goes to step 3_5 in which user information of the user requesting a joining is added to the user information list associated with the communication area, and then goes to step 3_6 in which it is informed the client requesting a joining that the user is allowed to join in as a ghost.

On the other hand, in step 3_4, when it is determined that the number of ghosts reaches the upper limit, the process goes to step 3_10 in which it is informed the client requesting a joining that the joining process ended in failure.

Further, in step 3_3, when it is determined that the client wishes to join in as an avatar, the process goes to step 3_7 in which an avatar management table associated with the communication area of interest is referred to so as to investigate the number of persons joining in the communication area as an avatar, and it is determined whether the number of persons reaches the upper limit shown in the inherent-information obtained in step 3_2.

When the number of avatars on the communication area does not reach the upper limit, the process goes to step 3_8 in which user information of the user requesting a joining is added to the avatar management table, and then goes to step 3_9 in which it is informed all the clients, who join as avatars or ghosts in the communication area of interest, that the user is allowed to join in as an avatar.

On the other hand, in step 3_7, when it is determined that the number of avatars reaches the upper limit, the process goes to step 3_10 in which it is informed the client requesting a joining that the joining process ended in failure.

Figure 4:
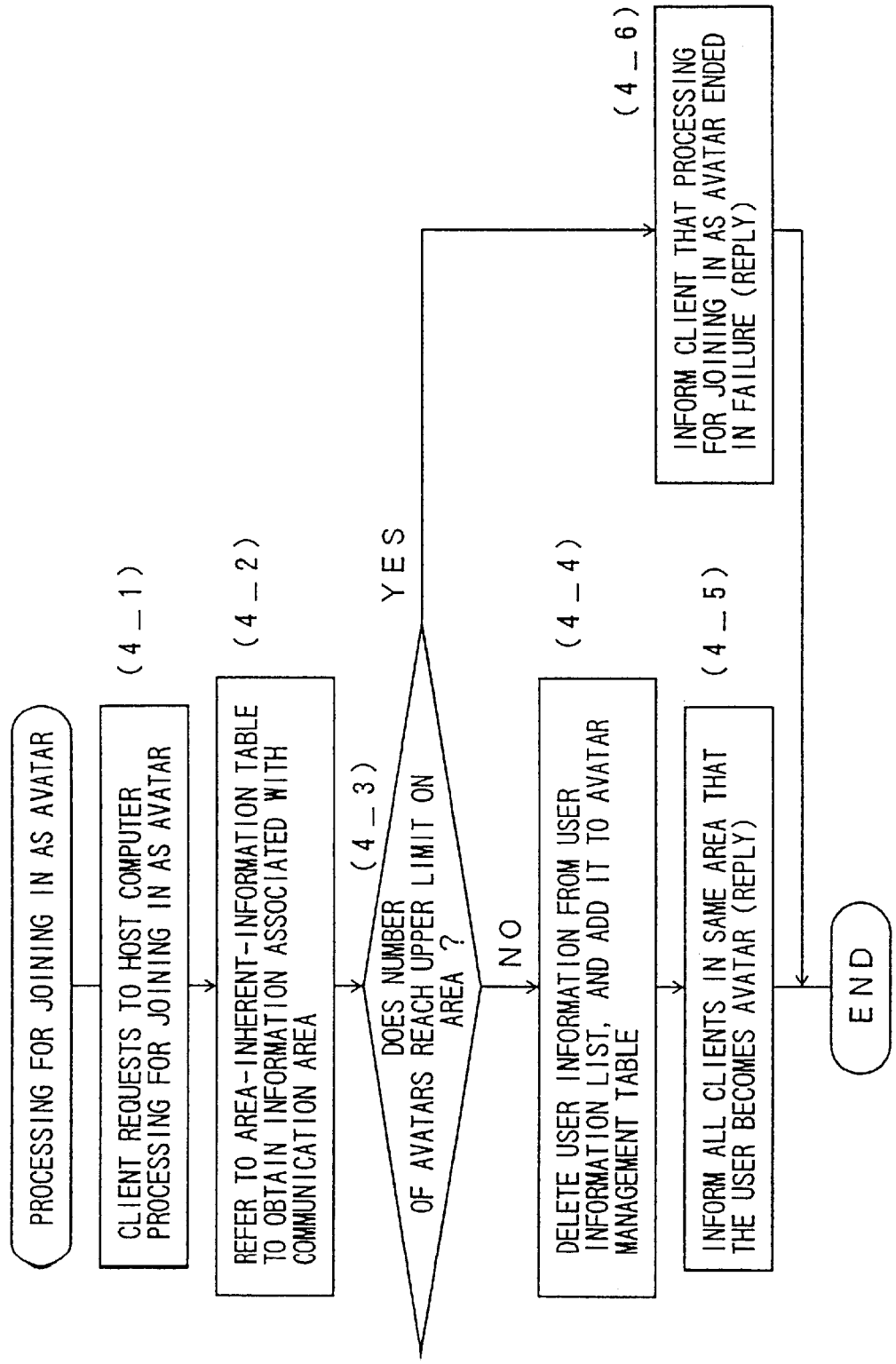
FIG. 4 is a flowchart useful for understanding a processing for joining in as an avatar in a case where a client, who joins in as a ghost, makes a request for joining in as avatar, in a message communication system having the host computer of the constitution shown in FIG. 1.

FIG. 4 is a flowchart useful for understanding a processing for joining in as an avatar in a case where a client, who joins in as a ghost, makes a request for joining in as avatar, in a message communication system having the host computer of the constitution shown in FIG. 1.

Figure 19:
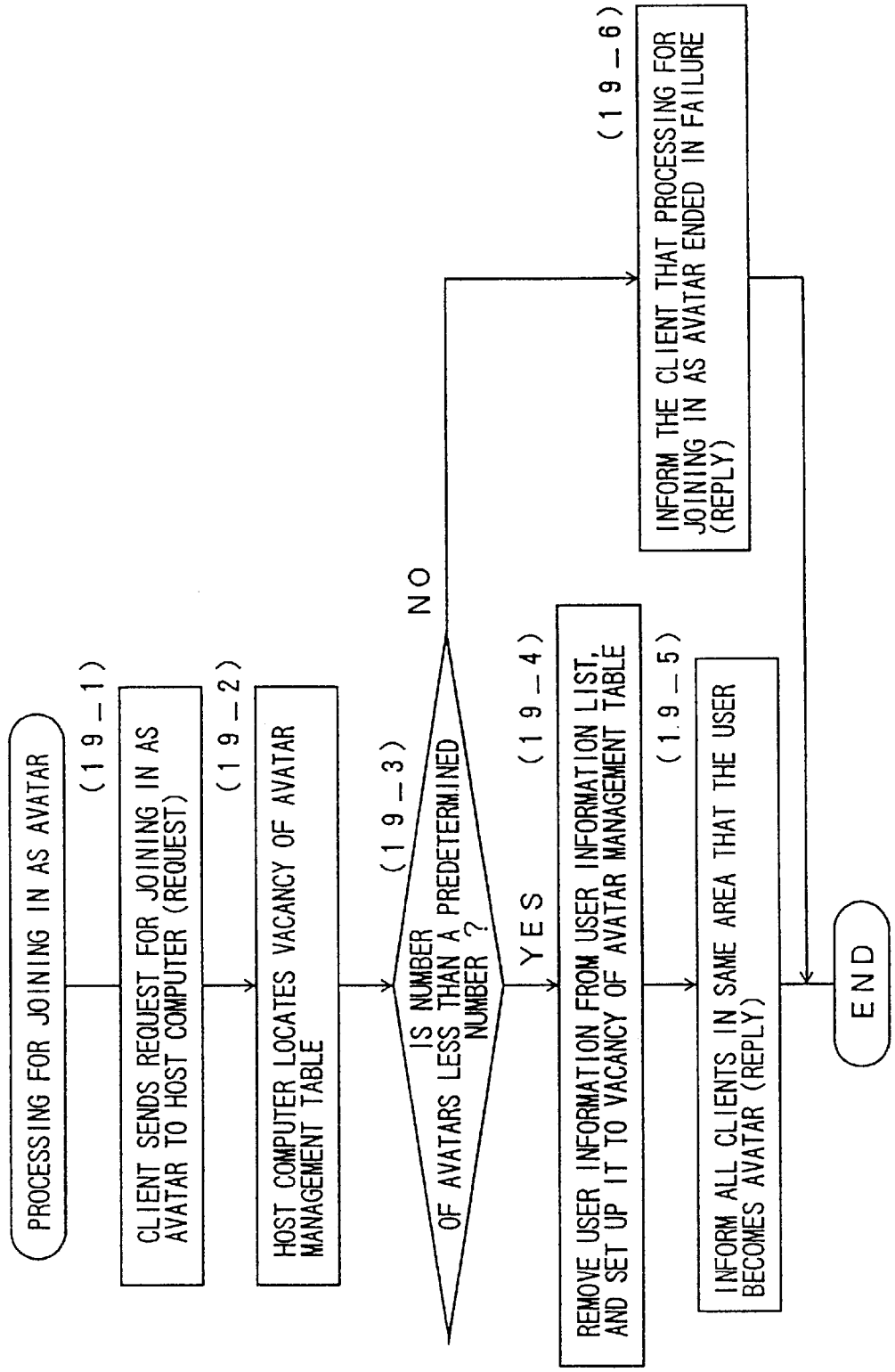
FIG. 19 is a flowchart useful for understanding a processing for joining in as an avatar in a case where a user, who joins in as a ghost, makes a request for joining in as an avatar, in a message communication system provided with a host computer having the user management unit of the constitution shown in FIG. 16.

As compared with the avatar joining process shown in FIG. 19, the avatar joining process shown in FIG. 4 is different in the following points.

That is, in step 4_2, there is obtained inherent-information on the communication area in which the client wishes to join as an avatar. And in step 4_3, the inherent-information obtained in step 4_2 is referred to so that it is determined whether the number of avatars reaches the upper limit which is set up independently on the communication area. Other steps 4_1, 4_4 to 4_6 are the same as steps 19_1, 19_4 to 19_6 concerning the avatar joining process shown in FIG. 19, respectively, and thus the detailed description will be omitted.

Figure 5:
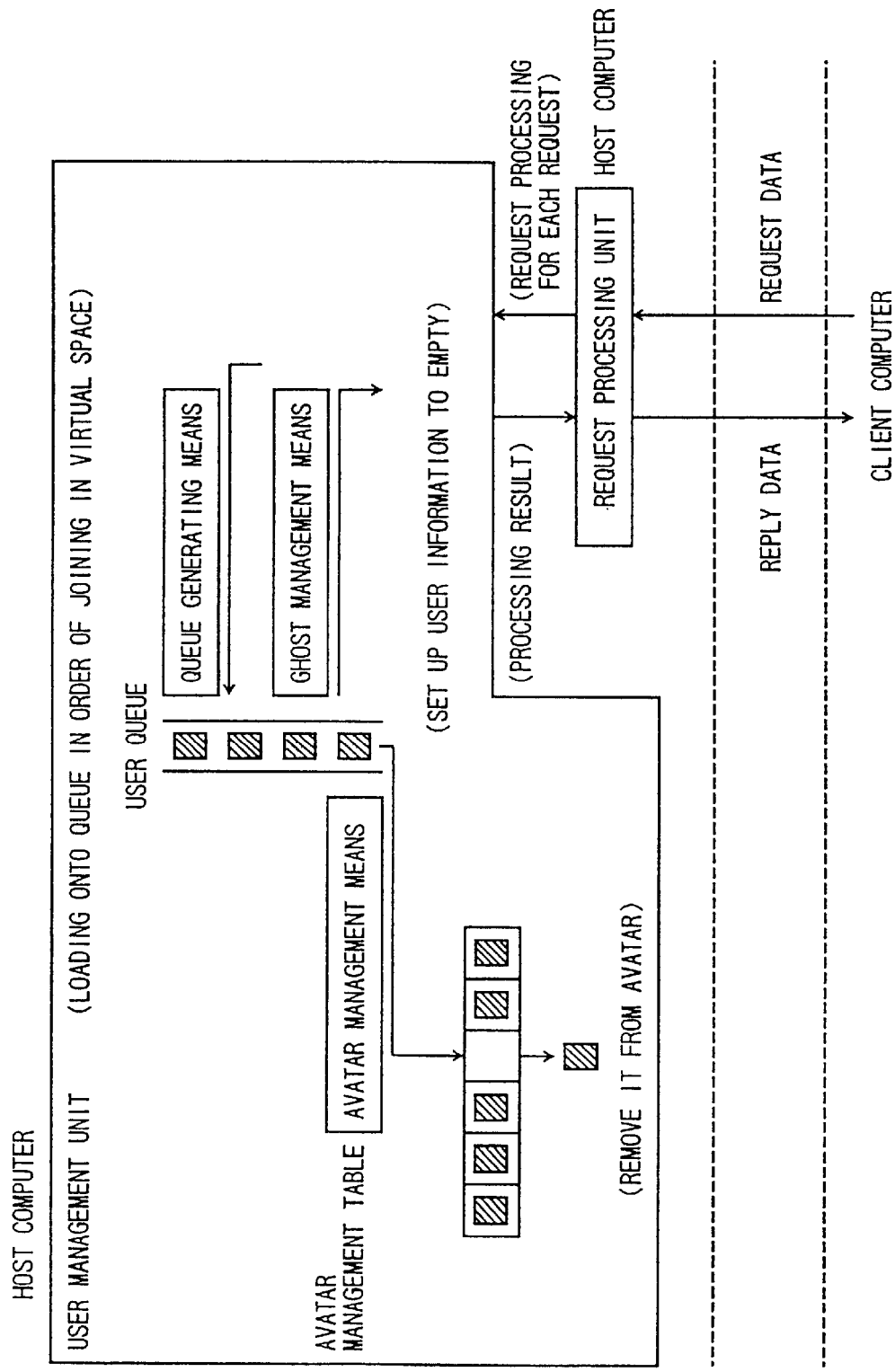
FIG. 5 is a typical construction view of a user management system incorporated into a host computer as one embodiment of the second communication management apparatus according to the present invention.

FIG. 5 is a typical construction view of a user management system incorporated into a host computer as one embodiment of the second communication management apparatus according to the present invention.

The user management system comprises: user queues each corresponding to the associated communication area, in which user information is recorded in the form of a queue; queue generating means for arranging, when a joining request is made, user information concerning the user making the joining request in the user queues; avatar management tables each corresponding to the associated communication area (where, a capacity of each of the avatar management tables is fixed to be even (6 members corresponding) on each communication area); avatar management means (corresponding to entrance management means referred to in the present invention) in which when a vacancy occurs on an avatar management table, user information located at the top of a user queue is removed from the user queue and add the same to the avatar management table; and ghost management means (corresponding to receiving only user terminal management means referred to in the present invention) for causing a user specified by user information set on the user queue to join as a ghost in communication area associated with the user queue.

Figure 6:
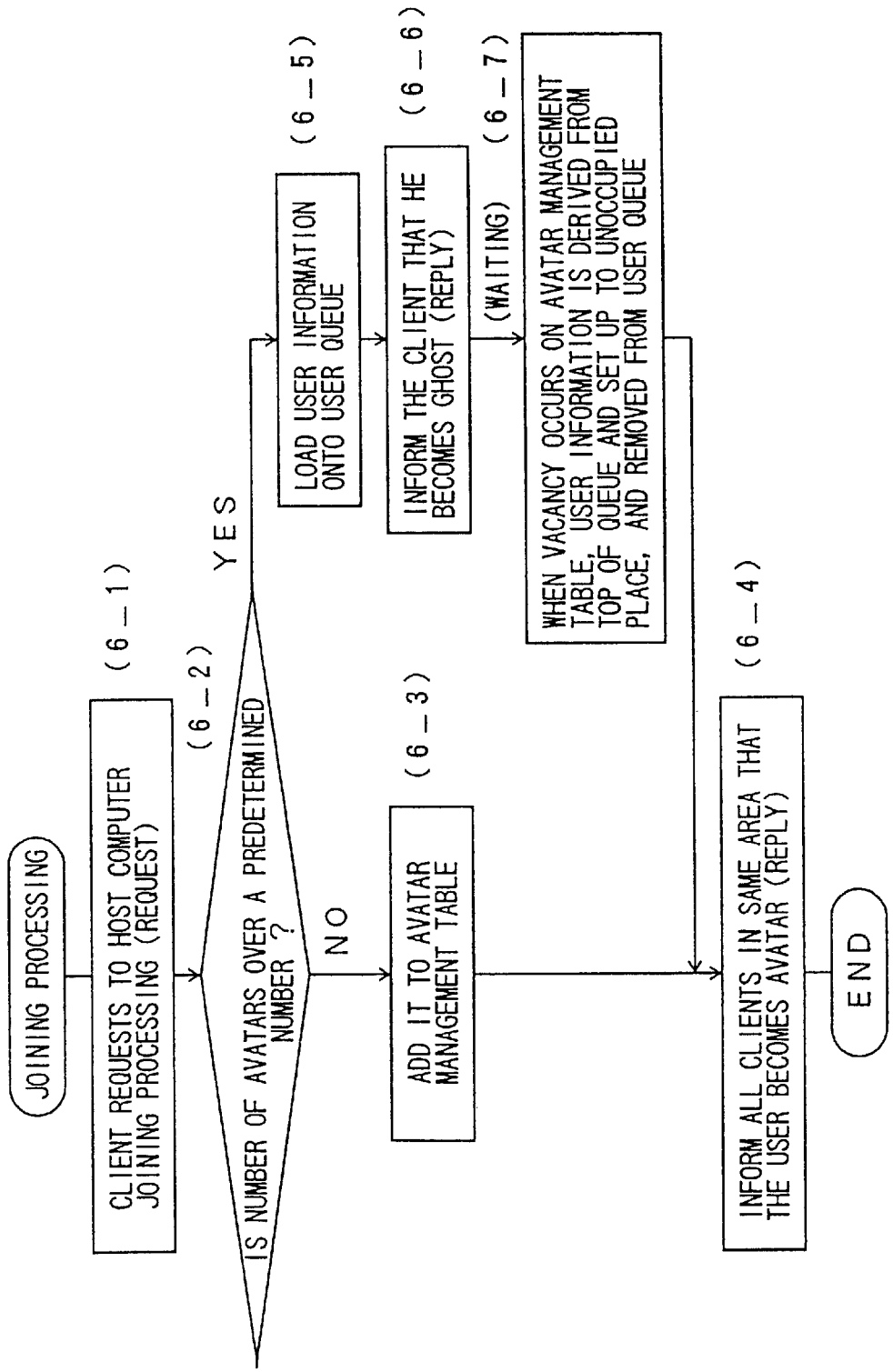
FIG. 6 is a flowchart useful for understanding a processing for joining in a communication area in a message communication system having the host computer of the constitution shown in FIG. 5.

FIG. 6 is a flowchart useful for understanding a processing for joining in a communication area in a message communication system having the host computer of the constitution shown in FIG. 5.

Figure 17:
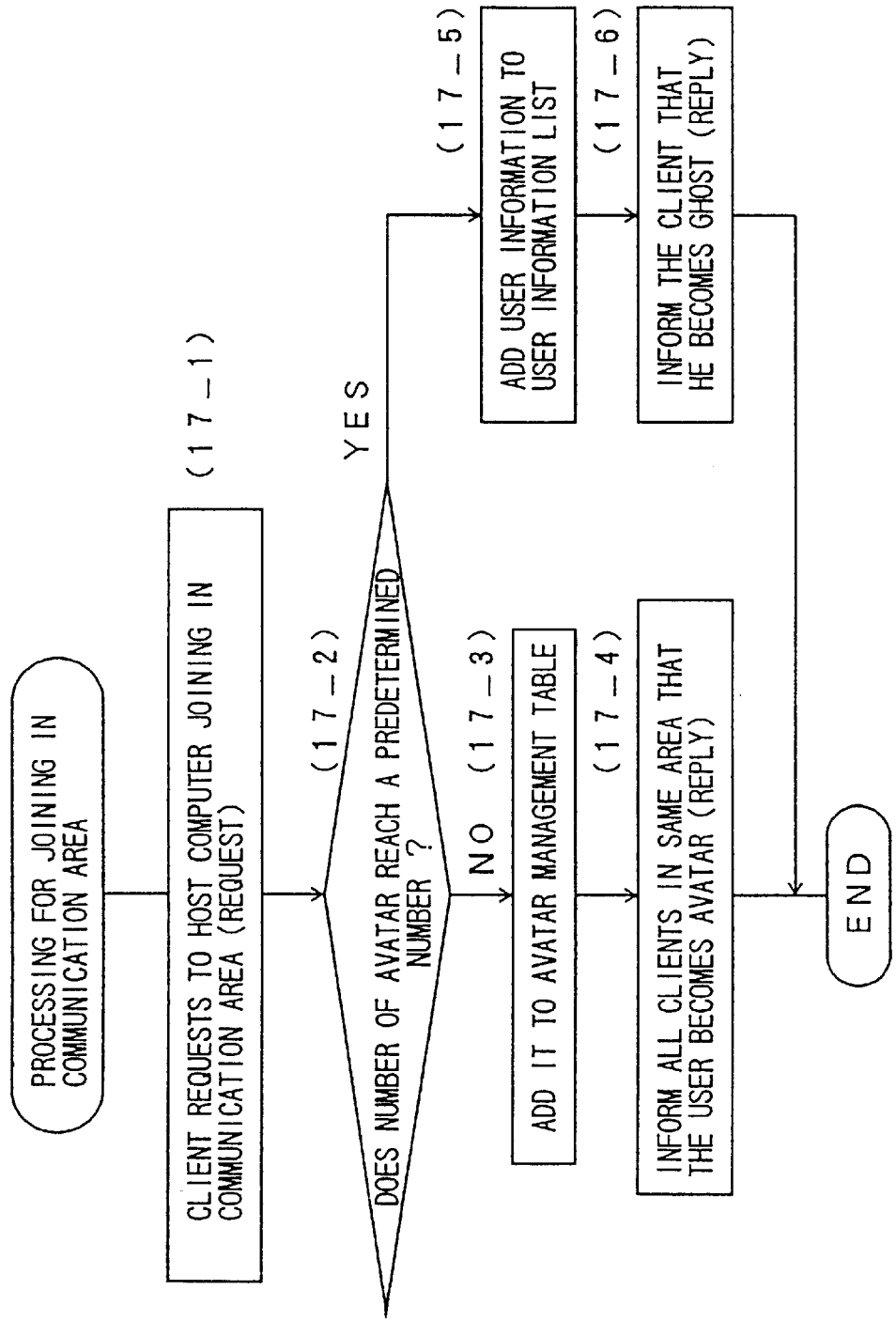
FIG. 17 is a flowchart useful for understanding a flow of a processing for joining in communication areas in a message communication system provided with the host computer having the user management unit of the constitution shown in FIG. 16.
Figure 18:
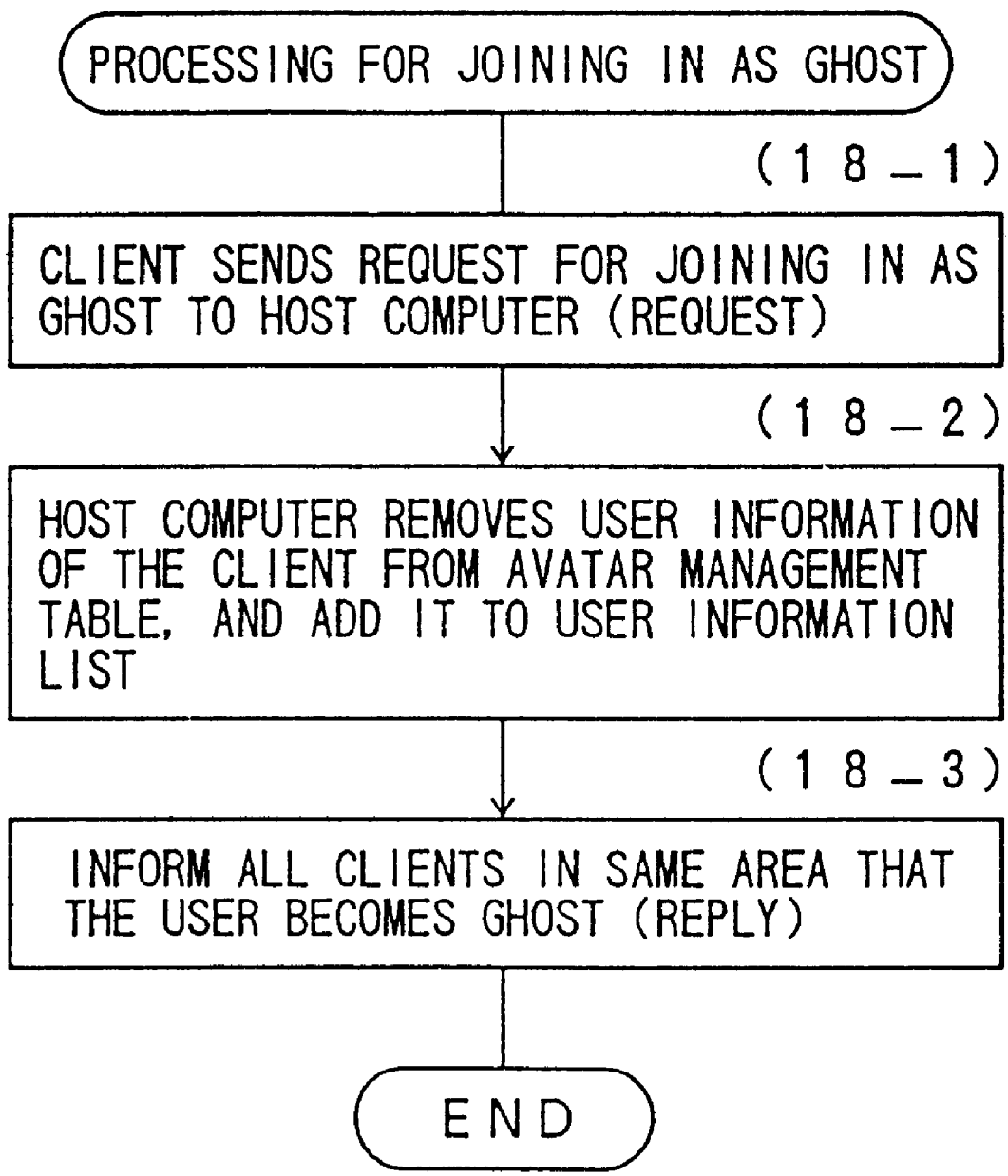
FIG. 18 is a flowchart useful for understanding a processing for joining in as a ghost in a case where a user, who joins in as an avatar, declared that the user wishes to change to a ghost, in a message communication system provided with a host computer having the user management unit of the constitution shown in FIG. 16.

The processes in steps 6_1 to 6_4 concerning the joining process shown in FIG. 6 are the same as those in steps 17_1 to 17_4 concerning the joining process shown in FIG. 17, respectively. Thus, a redundant description will be omitted.

In step 6_2, when it is determined that the number of avatars reaches a predetermined number, the process goes to step 6_5 in which user information as to a user requesting the joining is loaded onto the user queue. According to the present embodiment, there is no limit to the number of users to be loaded onto the user queue.

The user queue has the function equal to the user information list in the prior art (cf. FIG. 16), that is, such a function that when user information is registered onto the user information list, the client joins as a ghost in the communication area. In step 6_6, it is informed the client requesting the joining that he joins in as a ghost. In this condition, waiting for some time, and when the vacancy occurs on the avatar management table, user information is derived from the top of the queue and set up to unoccupied place of the avatar management table, and removed from the user queue (step 6_7). In this manner, as soon as the vacancy occurs on the avatar management table, the user, who is set to the top of the queue and joins in as the ghost, is automatically changed to a joining as an avatar. In step 6_4, it is informed all clients joining as avatars or ghosts in the communication area that the user changes from the ghost to the avatar.

Figure 7:
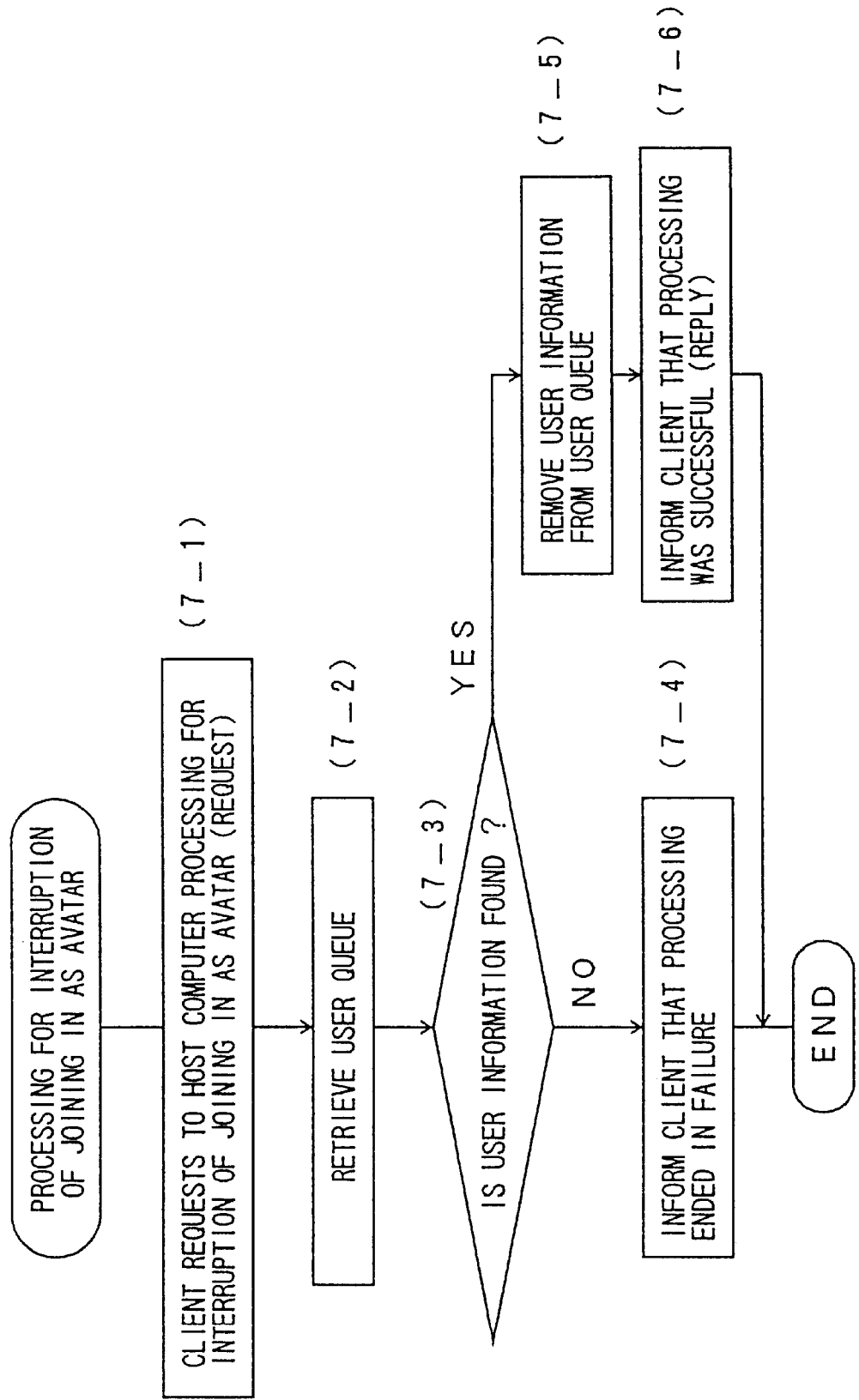
FIG. 7 is a flowchart useful for understanding a processing for interruption of joining in as an avatar in a message communication system having the host computer of the constitution shown in FIG. 5.

FIG. 7 is a flowchart useful for understanding a processing for interruption of joining in as an avatar in a message communication system having the host computer of the constitution shown in FIG. 5. This processing is performed in such a case that in the joining process shown in FIG. 6, the user is not permitted to join in as an avatar, and thus the user information is loaded onto the queue so that the user joins in as a ghost and waits for user's turn to be an avatar, and in this condition the user abandons a joining in as an avatar and wishes to leave the joining in as the ghost also.

In step 7_1, a client requests to the host computer a processing for interruption of a joining in as an avatar. In step 7_2, upon receipt of the client's request, the host computer retrieves the user queue. In step 7_3, it is determined whether there is found user information concerning the client who requested the processing for interruption of a joining in as an avatar. If such a user information is not found, the process goes to step 7_4 in which it is informed the client requested the interruption processing that the processing ended in failure, namely, that the user information of the client requested the interruption processing is not set on the queue. On the other hand, when the user information of the client requested the interruption processing is set on the queue, the process goes to step 7_5 in which the user information is removed from the user queue, so that the user leaves the joining in as the ghost also. In step 7_6, it is informed the client that the interruption processing was successful.

Figure 8:
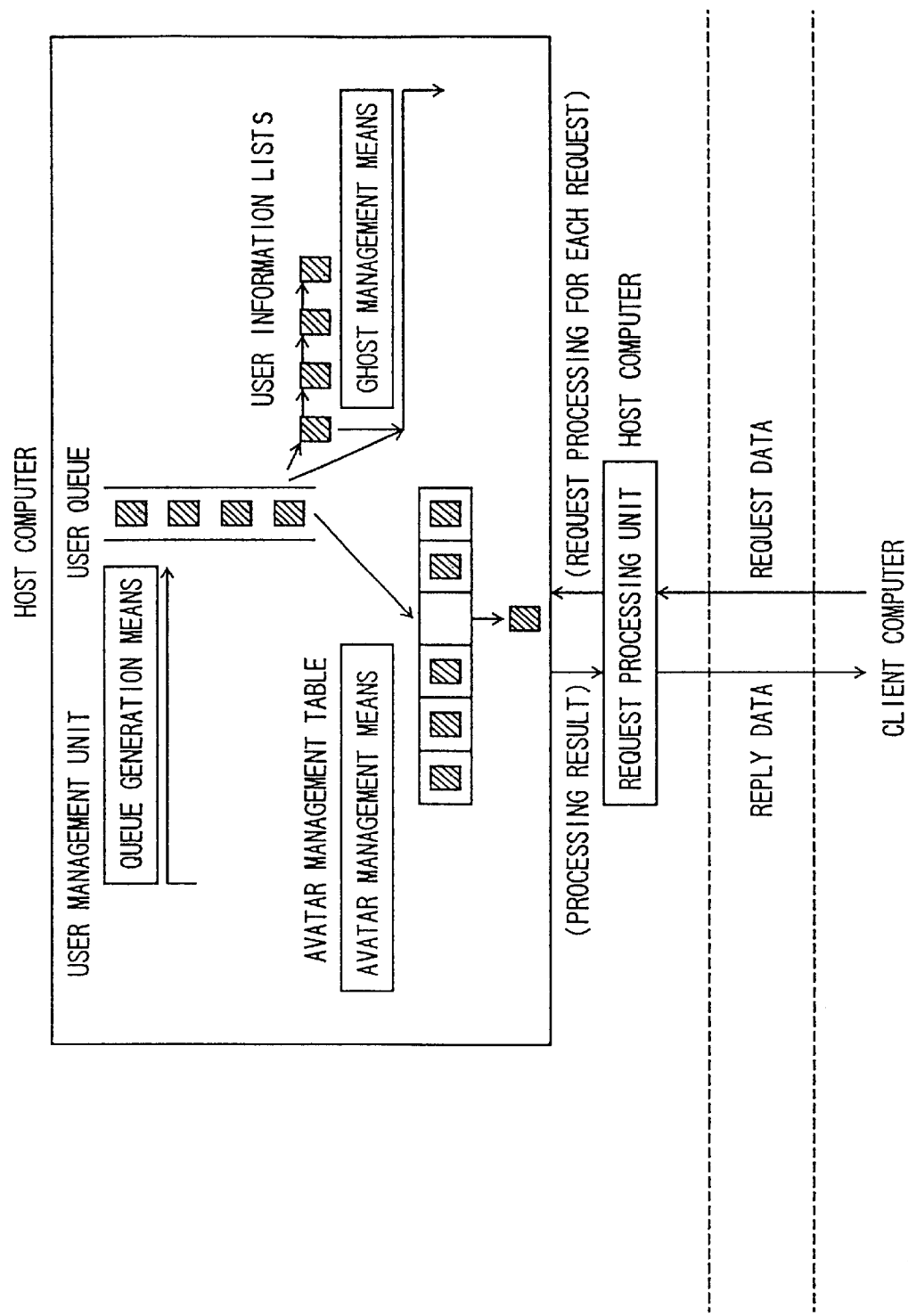
FIG. 8 is a typical construction view of a user management system incorporated into a host computer as another embodiment of the second communication management apparatus according to the present invention.

FIG. 8 is a typical construction view of a user management system incorporated into a host computer as another embodiment of the second communication management apparatus according to the present invention. Here, as means for joining in as ghosts, there are provided both user queues and user information lists each corresponding to the associated communication area. Ghost management means causes users, who are specified in accordance with user information registered on either of the user queues or the user information lists, to join in as ghosts.

Figure 9:
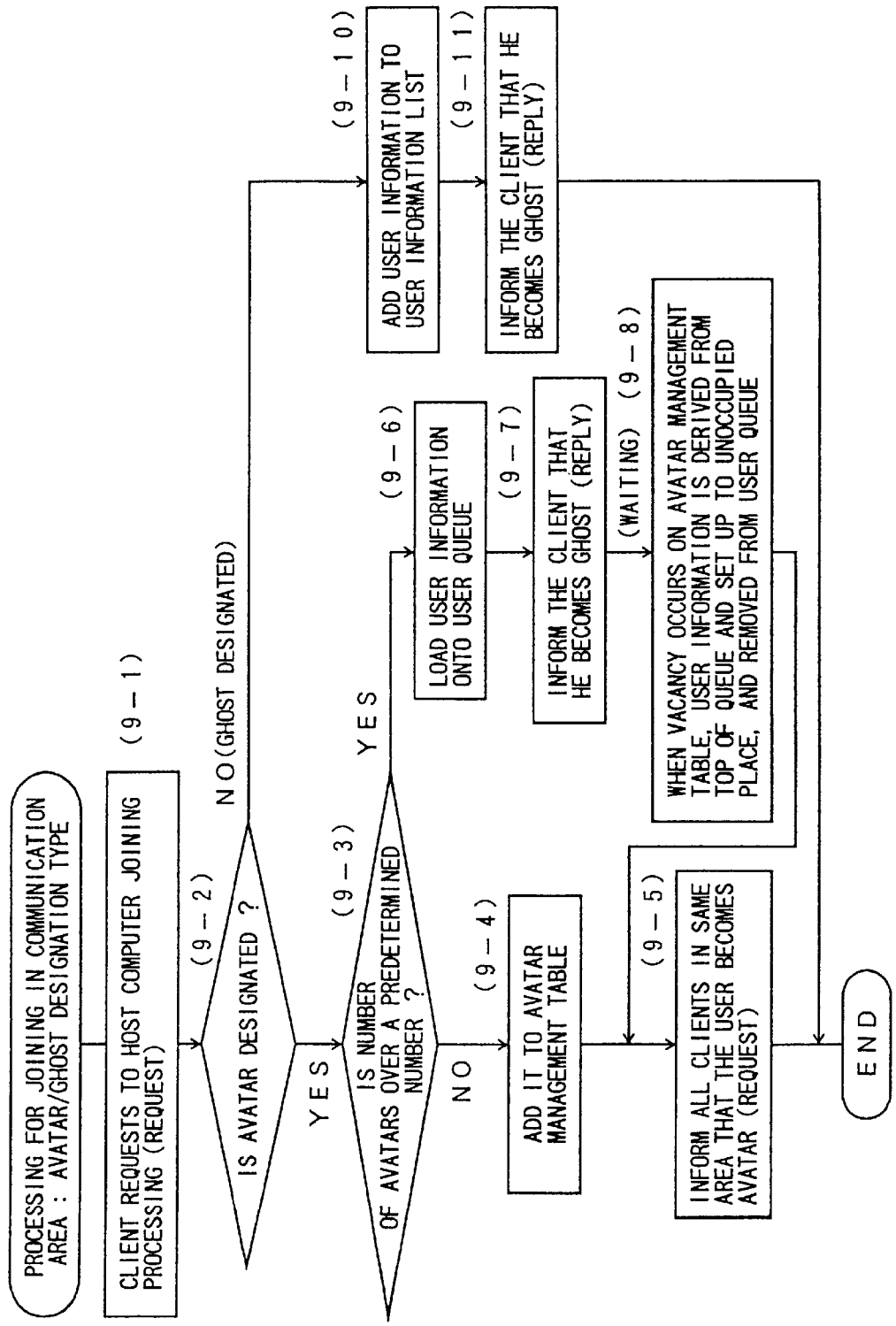
FIG. 9 is a flowchart useful for understanding a processing for joining in a communication area in a message communication system having the host computer of the constitution shown in FIG. 8.

FIG. 9 is a flowchart useful for understanding a processing for joining in a communication area in a message communication system having the host computer of the constitution shown in FIG. 8. A client requests a joining with designation of the communication area of interest and declaration as to whether the client wishes to join in as an avatar or a ghost.

In step 9_1, a client requests to the host computer a joining processing through designation of the communication area of interest and the avatar or the ghost as well. In step 9_2, upon receipt of the client's request, the host computer determines whether the client designates a joining in as an avatar or a ghost. When it is determined that the client designates a joining in as an avatar, the process goes to step 9_3. Steps 9_3 to 9_8 are the same as steps 6_2 to 6_7 concerning the joining process shown in FIG. 6 as mentioned above, respectively. In effects, those steps are involved in the following processing. That is, when the avatar management table is occupied in spite of designation of a joining in as an avatar, user information is loaded onto user queue, and while the client joins in as the ghost, the client waits for his turn to join in as an avatar.

In step 9_2, when it is determined that the client designates a joining in as a ghost, the process goes to step 9_10. Steps 9_10 to 9_11 are the same as steps 17_5 to 17_6 concerning the joining process shown in FIG. 17 as mentioned above, respectively. In effects, those steps are involved in the following processing. That is, when the client wishes to join in as a ghost from first, user information is not loaded onto the user queue and is registered on the user information list. The user information registered on the user information list means that while the client is allowed to join in as a ghost, the client is placed out of the subject of a joining in as an avatar even if vacancy occurs on the avatar management table.

Figure 10:
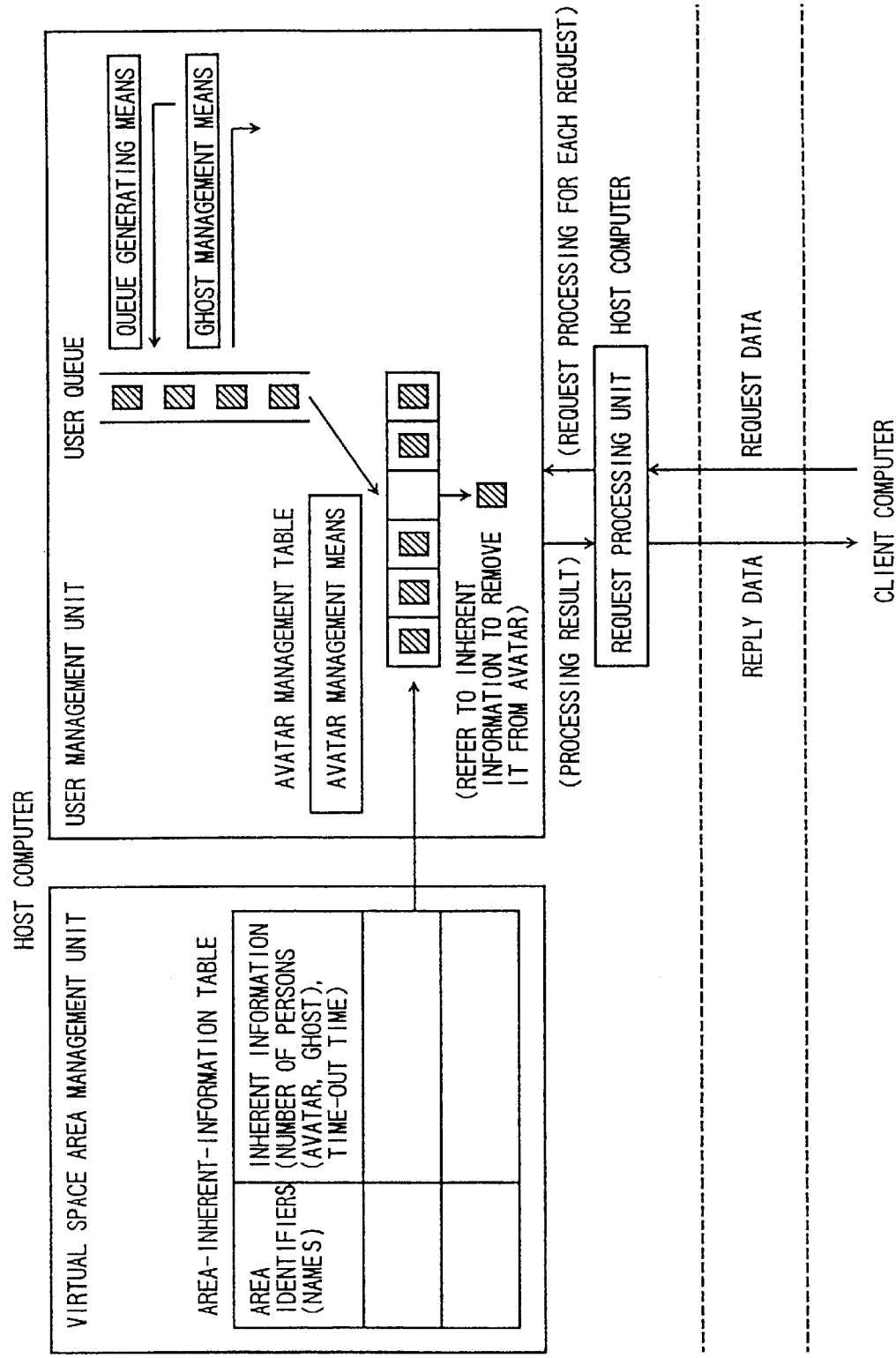
FIG. 10 is a typical construction view of a user management system incorporated into a host computer as one embodiment of the third communication management apparatus according to the present invention.

FIG. 10 is a typical construction view of a user management system incorporated into a host computer as one embodiment of the third communication management apparatus according to the present invention.

The host computer shown in FIG. 10 comprises: a virtual space area management unit having an area-inherent-information table, which is similar to that of the embodiment of the first communication apparatus shown in FIG. 1; and a user management unit which is similar to that of the embodiment of the second communication apparatus shown in FIG. 5. That is, according to the user management system shown in FIG. 10, the number of pieces of user information, which is permitted to be registered on the avatar management table, namely, the upper limit in the number of persons capable of joining in as avatars, is determined for each communication area in accordance with the respective inherent information registered on the area-inherent-information table. Incidentally, according to the present embodiment, it is assumed that the number of persons joining in as ghosts is not determined in the upper limit.

Figure 11:
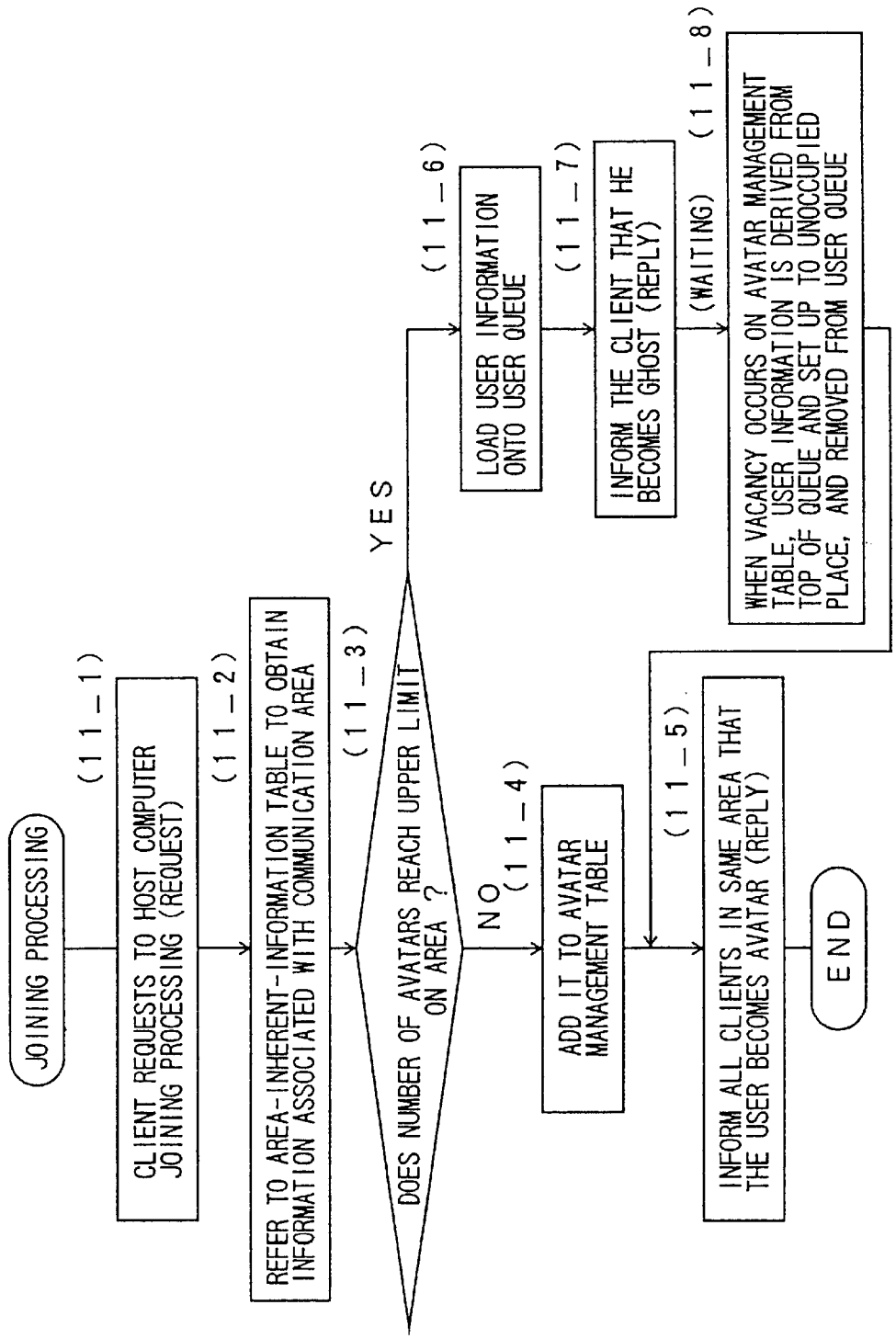
FIG. 11 is a flowchart useful for understanding a processing for joining in a communication area in a message communication system having the host computer of the constitution shown in FIG. 10.

FIG. 11 is a flowchart useful for understanding a processing for joining in a communication area in a message communication system having the host computer of the constitution shown in FIG. 10.

In step 11_1, a client requests to the host computer a joining process through designation of a communication area of interest. Upon receipt of the client's request, in step 11_2, the host computer refers to the area-inherent-information table to obtain inherent information associated with the communication area of interest. Hereinafter, the processes of steps 11_3 to 11_8 are the same as those of steps 6_2 to 6_7 involved in the joining processing shown in FIG. 6, respectively, except for that the upper limit in the number of avatars is determined for each communication area in accordance with the number of persons registered on inherent information. Thus, the redundant description will be omitted.

Figure 12:
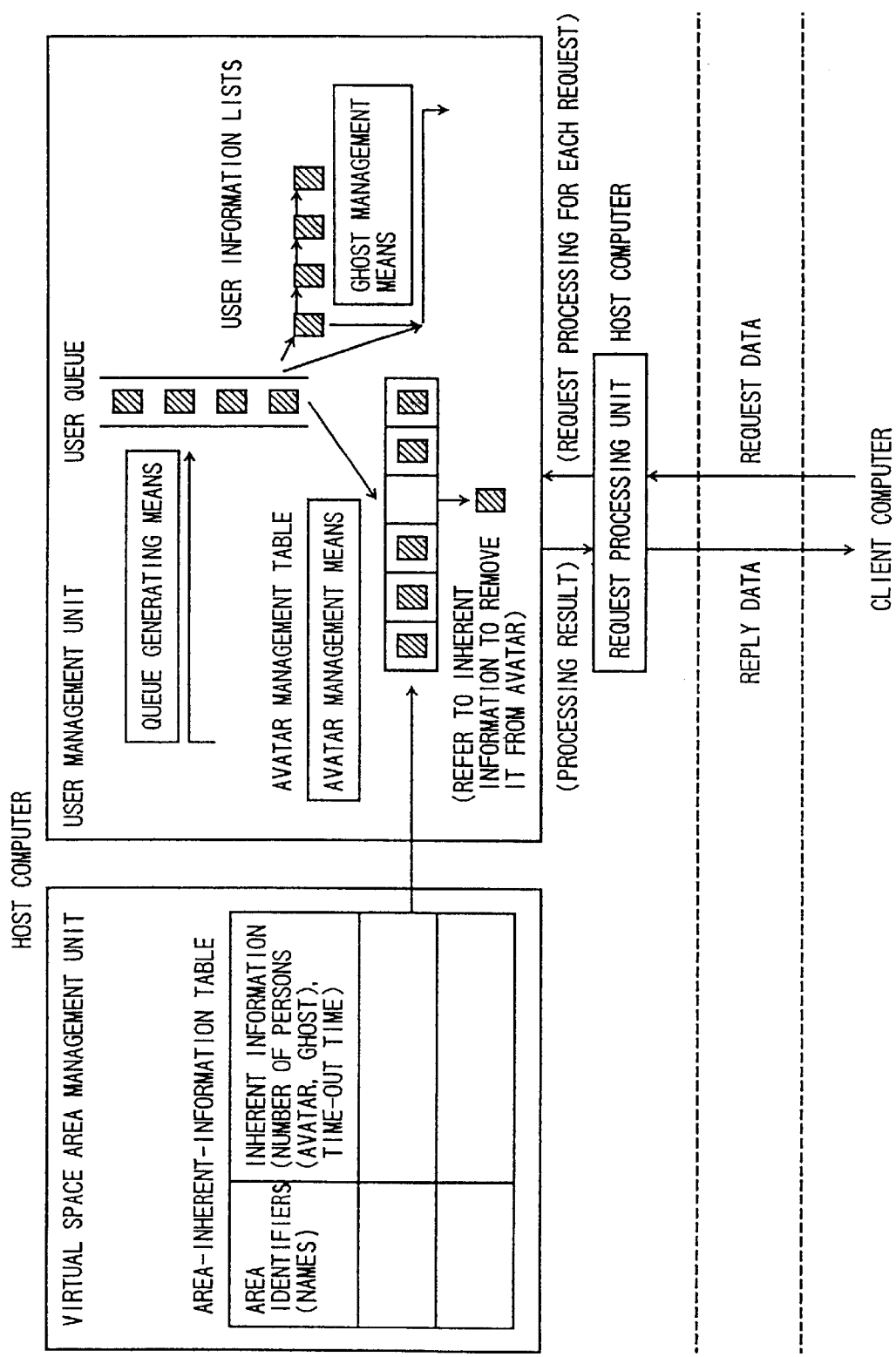
FIG. 12 is a typical construction view of a user management system incorporated into a host computer as another embodiment of the third communication management apparatus according to the present invention.

FIG. 12 is a typical construction view of a user management system incorporated into a host computer as another embodiment of the third communication management apparatus according to the present invention.

The host computer shown in FIG. 12 comprises: a virtual space area management unit having an area-inherent-information table, which is similar to that of the embodiment of the first communication apparatus shown in FIG. 1; and a user management unit having both user queues and user information lists, which is similar to that of the embodiment of the second communication apparatus shown in FIG. 8. That is, according to the user management system shown in FIG. 12, the upper limit in the number of persons capable of joining in as avatars and ghosts as well is determined for each communication area in accordance with the respective inherent information.

Figure 13:
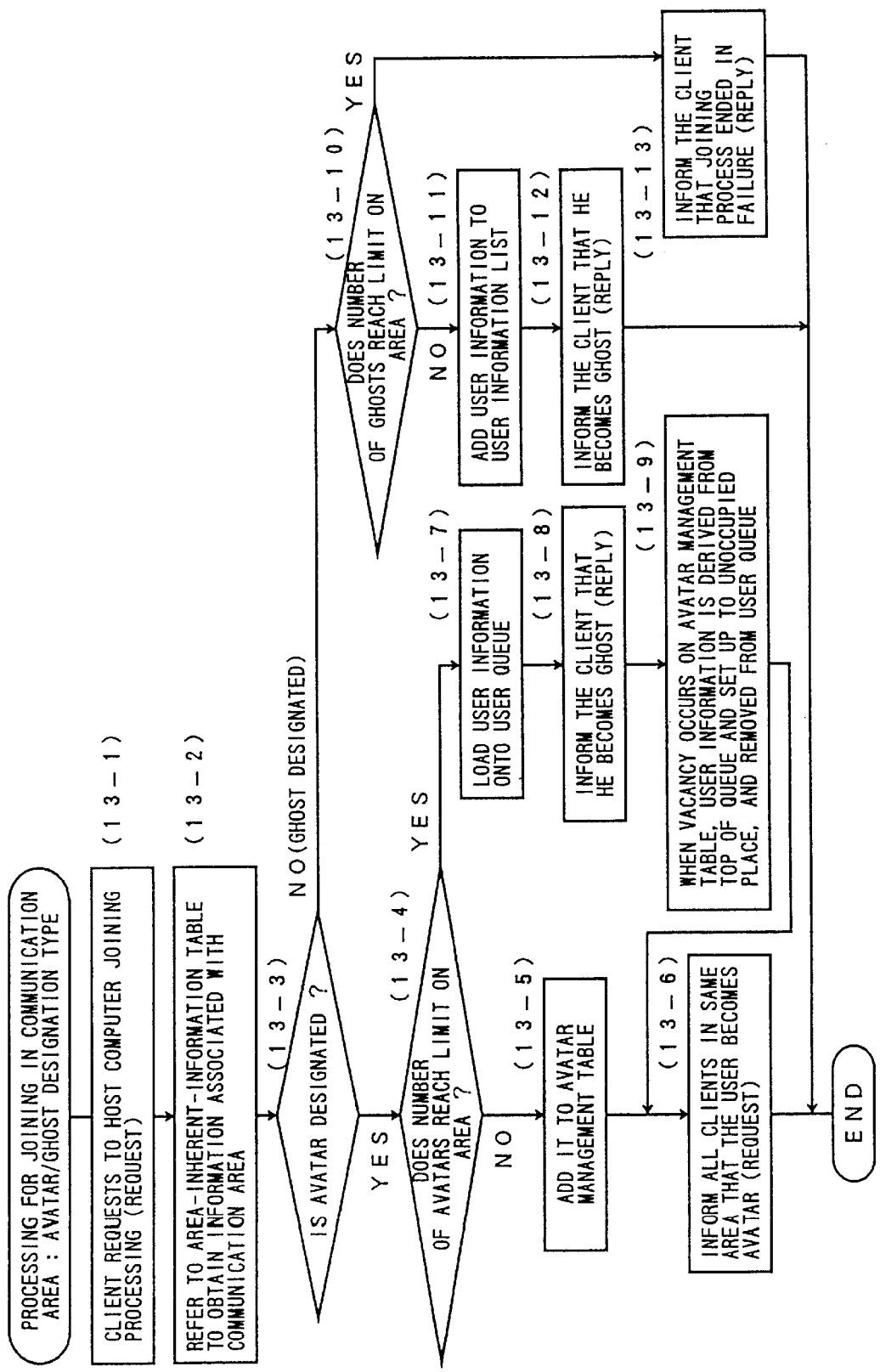
FIG. 13 is a flowchart useful for understanding a processing for joining in a communication area in a message communication system having the host computer of the constitution shown in FIG. 12.
Figure 14:
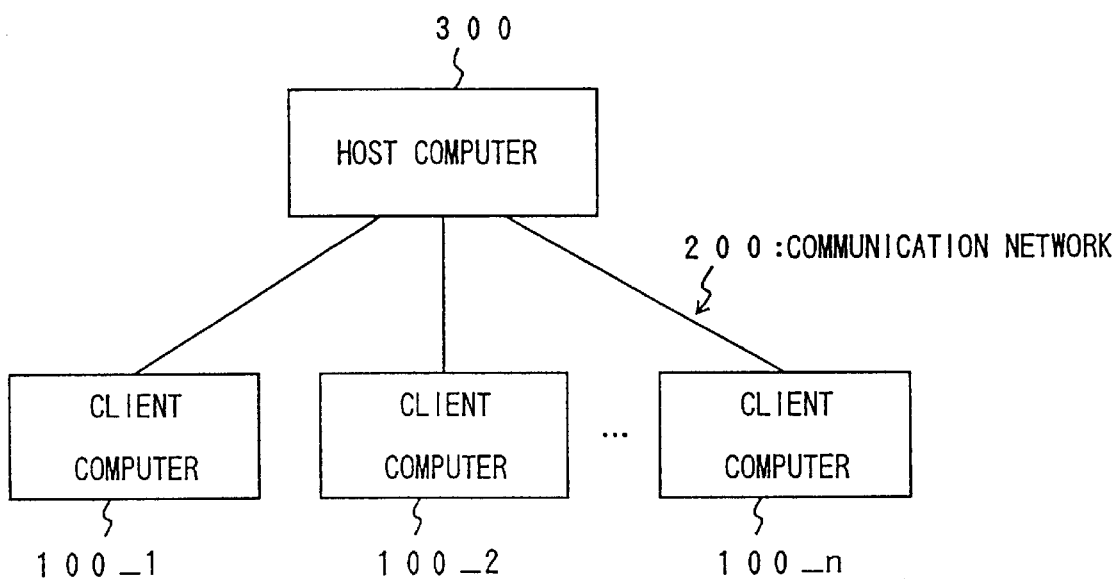
FIG. 14 is a conceptual diagram of a message communication system comprising so-called servers and clients.
Figure 15:
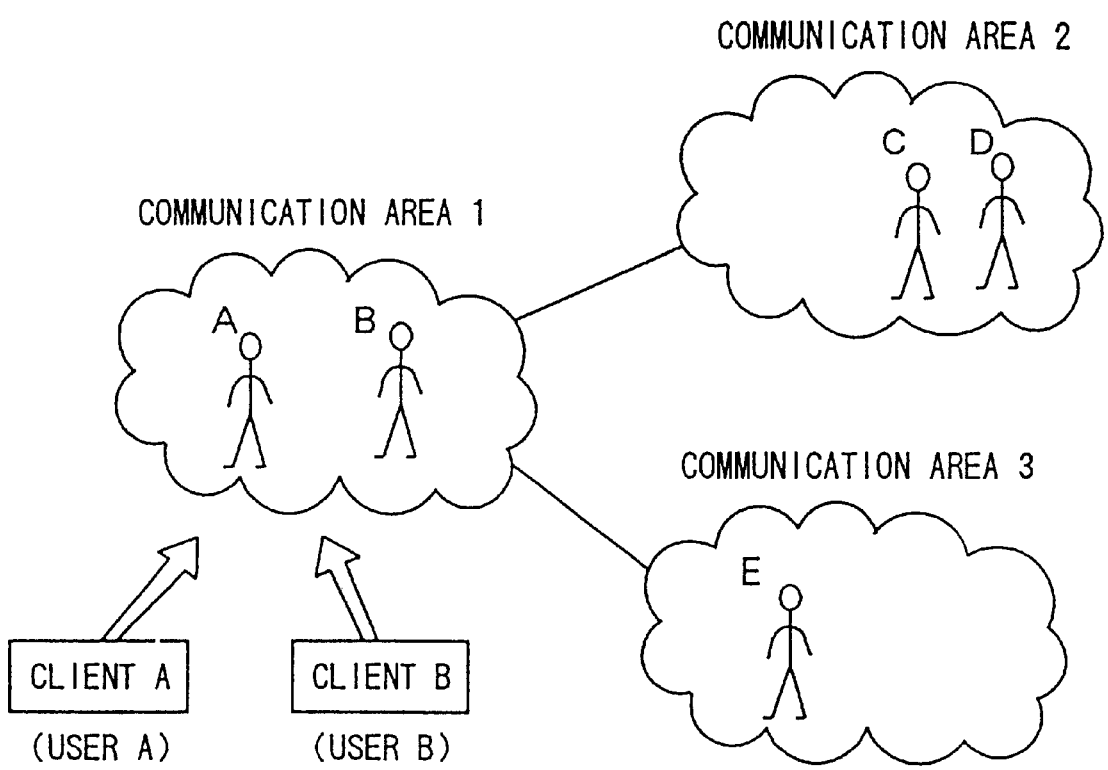
FIG. 15 is a conceptual diagram of a message communication system in which avatars (or symbols) of the clients enter the virtual world and have conversations.

FIG. 13 is a flowchart useful for understanding a processing for joining in a communication area in a message communication system having the host computer of the constitution shown in FIG. 12.

In step 13_1, a client requests to a host computer a joining through designation of a desired communication area, and further designation as to whether the client wishes to join in the communication area as an avatar or as a ghost. In step 13_2, upon receipt of the client's request, the host computer refers to the area-inherent-information table to obtain the inherent information on the communication area in which the client wishes to join. In step 13_3, it is determined whether the client wishes to join as an avatar or as a ghost. When the client wishes to join as a ghost, the process goes to step 13_4. The processes of steps 13_4 to 13_9 are the same as those of steps 9_3 to 9_8 involved in the joining processing explained referred to FIG. 9, respectively, except for that the upper limit in the number of persons joining as avatars is determined for each communication area in accordance with inherent information associated with the respective communication area. Thus, the redundant description will be omitted.

Further, in step 13_3, when it is determined that the client wishes to join in as a ghost, the process goes to step 13_10. The processes of steps 13_10 to 13_13 are the same as those of steps 3_4 to 3_6, and 3_10 involved in the joining processing explained referred to FIG. 3, respectively, except for that the upper limit in the number of persons joining as ghosts is determined for each communication area in a similar fashion to that of the avatar. Thus, the redundant description will be omitted.

In the embodiments explained referred to FIGS. 1, 10 and 12, while there has been omitted the description as to a time-out time of the inherent information on the area-inherent-information table, the time-out time will be explained hereinafter. When a user joins in as an avatar, there is measured a time in which the client joins in as an avatar. When the time thus measured exceeds a time-out time, the user information is removed from the avatar management table regardless of the user's will. This implies, in a case where the number of persons requesting a joining in as avatars is large, to provide for as many as users an opportunity to join in as avatars. This time-out time is also set up for each communication area. Incidentally, it is acceptable, when there is no new user requesting a joining in as an avatar even if the avatar joining time exceeds the time-out time, to permit the user to continuously join in as an avatar until a new user requesting a joining in as an avatar appears.

As mentioned above, according to the present invention, it is possible to provide a communication management apparatus suitable for constituting a message communication system which is more abounding in flexibility and higher in operability in the client end as compared with the conventional apparatus.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A communication management apparatus for managing a joining of symbols in a virtual world in a message communication system in which a plurality of user terminals are interconnected, the plurality of user terminals sharing the virtual world comprising a plurality of virtual spaces, and the symbols each defined for the associated one of the user terminals which will join the virtual world, and messages are exchanged among a plurality of user terminals corresponding to a plurality of symbols which have entered the same virtual space, wherein said message communication system is a system in which a number of symbols, who are permitted in their simultaneous entrance in each of said plurality of virtual spaces, is set up in upper limit, and wherein said communication management apparatus comprises:

queue generating means for arranging, in a case where the upper limit of number of symbols have entered any of said plurality of virtual spaces, symbol ID information specifying a symbol requesting entrance in a queue corresponding to the virtual space of interest, when a further request for entrance into the virtual space of interest occurs; and entrance management means for providing such a control that when any of the upper limit of number of symbols entered any of said plurality of virtual spaces is removed from the virtual space and when pieces of symbol ID information are set on the queue corresponding to the virtual space of interest, a symbol specified by symbol ID information set on the top of the queue is entered in the virtual space of interest, and the symbol ID information set on the top of the queue is deleted from the queue.

2. A communication management apparatus according to claim 1, wherein said message communication system permits presence of receiving only user terminals for performing receiving only of messages to be exchanged between the user terminals joined in exchange of messages, in addition to the user terminals joining in exchange of messages corresponding to the symbols entered the virtual space; and wherein said communication management apparatus further comprises a receiving only user terminal management unit for causing the user terminals specified by the pieces of symbol ID information set on the queue to join in the virtual space associated with the queue in form of the receiving only user terminals.

3. A communication management apparatus for managing a joining of symbols in a virtual world in a message communication system in which a plurality of user terminals are interconnected, the plurality of user terminals sharing the virtual world comprising a plurality of virtual spaces, and the symbols each defined for the associated one of the user terminals which will join the virtual world, and messages are exchanged among a plurality of user terminals corresponding to a plurality of symbols which have entered the same virtual space, said communication management apparatus comprising:

a virtual space area management unit for holding pieces of area-inherent-information each to control an upper limit of number of simultaneous entrance of the symbols into the virtual space, each corresponding to an associated one of said plurality of virtual spaces; and a user management unit for managing entrance of the symbols for each virtual space in accordance with the area-inherent-information, wherein said user management unit comprises:

queue generating means for arranging, in a case where the upper limit of number of symbols have entered any of said plurality of virtual spaces, symbol ID information specifying a symbol requesting entrance in a queue corresponding to the virtual space of interest, when a further request for entrance into the virtual space of interest occurs; and entrance management means for providing such a control that when any of the upper limit of number of symbols entered any of said plurality of virtual spaces is removed from the virtual space and when pieces of symbol ID information are set on the queue corresponding to the virtual space of interest, a symbol specified by symbol ID information set on the top of the queue is entered in the virtual space of interest, and the symbol ID information set on the top of the queue is deleted from the queue.

4. A communication management apparatus according to claim 3, wherein said message communication system permits presence of receiving only user terminals for performing receiving only of messages to be exchanged between the user terminals joined in exchange of messages, in addition to the user terminals joining in exchange of messages corresponding to the symbols entered the virtual space; and wherein said user management unit comprises a receiving only user terminal management unit for causing the user terminals specified by the pieces of symbol ID information set on the queue to join in the virtual space associated with the queue in form of the receiving only user terminals.

5. A communication management apparatus for enabling communications to occur among a plurality of users, each the plurality of users identified by a symbol identification, in one of a plurality of virtual spaces selected by each of the plurality of users; comprising:

a virtual space area management unit to manage the plurality of virtual spaces by maintaining an area-inherent-information table that designates a number users that are permitted communications in a virtual space as avatars, the number of users permitted access to a virtual space as ghosts, a maximum time period that a user may remain as an avatar, wherein an avatar may receive information transmitted by other avatars in the virtual space and transmit information to other avatars in the virtual space, and a ghost may receive information transmitted by avatars but not transmit information to avatars or other ghosts in the virtual space; and a user management unit to manage the entry of users into each of the plurality of virtual spaces as either avatars or ghosts comprising:

queue generating means for generating and maintaining a queue containing the symbol identification of users denied entry to the virtual space and designated as ghosts awaiting entry to the virtual space as avatars when the maximum number of avatars permitted in the area-inherent-information table is met by the existing avatars in the virtual space, wherein the symbol identification of a user is added to the queue when the maximum number of ghosts designated by the area-inherent-information table is not exceeded and users in the queue designated as ghosts may receive information transmitted by avatars but not transmit information to ghosts or avatars; and entrance management means for managing entry of users as avatars into the virtual space from the queue containing the symbol identification of users designated as ghosts when the maximum number of avatars drops below the maximum number permitted in the area-inherent-information table due to users leaving the virtual space when their maximum time as avatars expires as designated by the area-inherent-information table and when users leave the virtual space of their own accord, whereby the users that have changed their designation from ghosts to avatars have received all prior transmissions of avatars in the virtual space and can meaningfully engage in the transmission of information to avatars in the virtual space.

* * * * *